(12) United States Patent
Baba et al.

(10) Patent No.: US 7,127,229 B2
(45) Date of Patent: Oct. 24, 2006

(54) EMERGENCY REPORT CELLULAR PHONE, CELLULAR CONNECTION SWITCHING METHOD AND GPS POSITIONING METHOD

(75) Inventors: Yoshihiko Baba, Ichikawa (JP); Teruhide Kunimitsu, Chiba (JP); Kenji Sekine, Funabashi (JP); Mikio Iwakuni, Yachiyo (JP); Katsuhiro Miyamoto, Chiba-ken (JP); Toshiaki Yuasa, Chiba-ken (JP); Toshihiro Takahashi, Ichikawa (JP); Norio Abe, Funabashi (JP); Shuji Konishi, Chiba (JP); Tadashi Kogure, Tokyo (JP); Jun Yoshida, Ichikawa (JP); Katsuya Kaneda, Tokyo (JP); Isao Ohki, Yachiyo (JP); Masaru Akiyama, Chiba (JP); Masato Suzuki, Tokyo (JP)

(73) Assignee: Uniden Corporation, Tokyo (JP)

( * ) Notice: Subject to any disclaimer, the term of this patent is extended or adjusted under 35 U.S.C. 154(b) by 618 days.

(21) Appl. No.: 10/233,666

(22) Filed: Sep. 4, 2002

(65) Prior Publication Data

US 2003/0050039 A1   Mar. 13, 2003

(30) Foreign Application Priority Data

| Sep. 4, 2001 | (JP) | ............................. 2001-268054 |
| Sep. 4, 2001 | (JP) | ............................. 2001-268055 |
| Sep. 21, 2001 | (JP) | ............................. 2001-289098 |
| Sep. 25, 2001 | (JP) | ............................. 2001-292163 |

(51) Int. Cl.
*H04M 11/04* (2006.01)

(52) U.S. Cl. .............................. 455/404.1; 455/456.1; 455/404.2; 455/521

(58) Field of Classification Search ............. 455/404.1, 455/552.1, 553.1, 321, 456.1, 575.9, 434, 455/404.2, 521, 414.1; 381/104
See application file for complete search history.

(56) References Cited

U.S. PATENT DOCUMENTS 5,535,271 A * 7/1996 Jangi et al. .................. 379/351

(Continued)

FOREIGN PATENT DOCUMENTS

JP         2000-106608         4/2000

(Continued)

*Primary Examiner*—Matthew D. Anderson
*Assistant Examiner*—Tan Trinh
(74) *Attorney, Agent, or Firm*—McDermott Will & Emery LLP

(57) ABSTRACT

The object of the present invention is to provide a cellular phone to be used for emergency reports that performs GPS positioning by means of remote control from an emergency report center, and transmits positional information to the emergency report center. The emergency report cellular phone according to the present invention is constituted such that when an emergency report switch thereof is depressed, a call request is made to the emergency report center. The emergency report center transmits a response signal with the result that a call link is formed between the emergency report cellular phone and the emergency report center. Following completion of the telephone call, the emergency report center transmits a position recalculation command message, by means of a DTMF signal. The emergency report cellular phone, which has received this command message, performs GPS positioning and then converts latitudinal and longitudinal information to a DTMF signal before transmitting same to the emergency report center. As a result, even in a case where, in a time of emergency, a reporting party is unable to perform GPS positioning manually as a result of a poor physical condition, for example, since GPS positioning is possible by means of remote control, it is possible to rescue the reporting party in a rapid and reliable manner.

8 Claims, 26 Drawing Sheets

U.S. PATENT DOCUMENTS

| | | | |
|---|---|---|---|
| 6,636,732 B1 * | 10/2003 | Boling et al. | 455/404.1 |
| 6,801,762 B1 * | 10/2004 | Huilgol | 455/404.1 |
| 6,873,837 B1 * | 3/2005 | Yoshioka et al. | 455/321 |
| 2001/0014597 A1 * | 8/2001 | Takiguchi et al. | 455/343 |

FOREIGN PATENT DOCUMENTS

| | | |
|---|---|---|
| JP | 2000-270125 | 9/2000 |
| JP | 3115268 | 9/2000 |
| JP | 2001-4735 | 1/2001 |

* cited by examiner

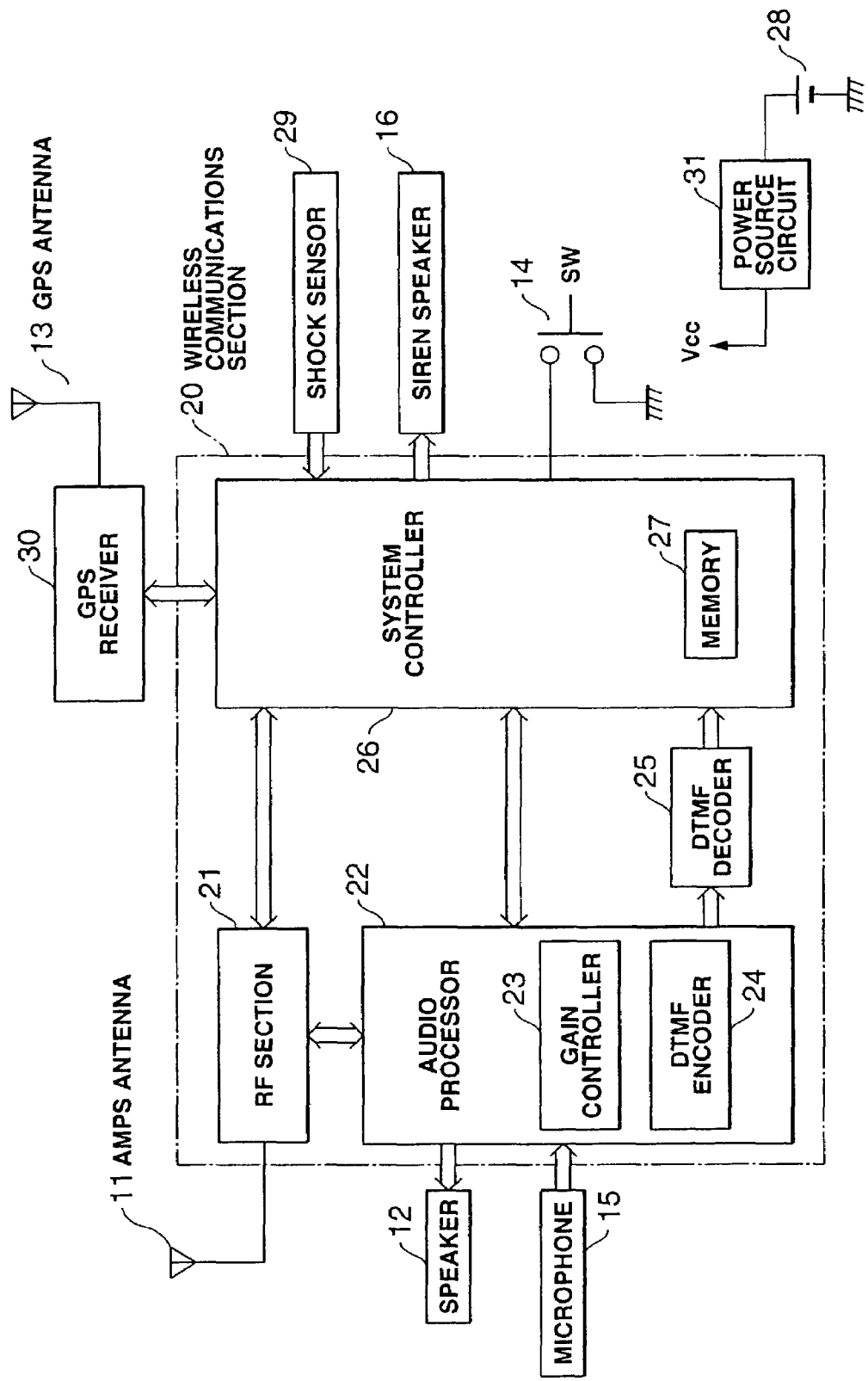

| DTMF SIGNAL | DTMF COMMAND MESSAGE |
|---|---|
| *1 | POSITION RECALCULATION REQUEST COMMAND MESSAGE |
| *2 | SIREN SPEAKER ACTIVATION/ SUSPENSION REQUEST COMMAND MESSAGE |
| *3 | SPEAKER ACTIVATION/ SUSPENSION REQUEST COMMAND MESSAGE |
| *4 | MICROPHONE ACTIVATION/ SUSPENSION REQUEST COMMAND MESSAGE |
| *5 | MOBILE STATE REQUEST COMMAND MESSAGE |
| *6 | DISCONNECTION REQUEST COMMAND MESSAGE |

EMERGENCY REPORT CELLULAR PHONE, CELLULAR CONNECTION SWITCHING METHOD AND GPS POSITIONING METHOD

BACKGROUND OF THE INVENTION

1. Field of the Invention

The present invention relates to a cellular phone to be used for emergency reports that comprises a GPS receiver and a wireless communications section, and more particularly to an improved technology for rapidly performing stable GPS positioning and for implementing a reliable cellular connection with an emergency report center.

2. Description of the Related Art

Conventionally, as a means of contacting an emergency report center when a physically handicapped person, for example, who has gone out, has a fit or another such state of emergency arises, a mobile-type emergency report cellular phone that contains a GPS receiver has been proposed by Japanese Patent Application Laid-open No. 2000-106608, for example. The cellular phone appearing in this same publication has a constitution in which a mobile telephone device is provided in an emergency report box comprising a push button, a body movement sensor, a GPS receiver, an SOS buzzer, and the like. By means of such a constitution, when a reporting party is in a state of emergency, by giving the push button a long push, he or she is able to make a report to an emergency report center via the mobile telephone. Furthermore, when the body movement sensor detects that a user's wheelchair has turned over or detects another such anomalous condition, the constitution is such that it is possible to automatically make a report to an emergency center via the mobile telephone. According to requirements, the emergency report box may be capable of receiving GPS signals transmitted from GPS satellites and of transmitting longitudinal and latitudinal information to the emergency report center. In addition to the above-mentioned paper, examples of mobile-type emergency report cellular phones of this kind, which are constituted from a GPS receiver and a wireless communications terminal, also include Japanese Patent Application Laid-open No. 2000-270125 and Patent No. 3115268.

However, in a conventional system, when the power source of the GPS receiver is in an ordinary ON state, since GPS positioning necessitates a complex operation, battery consumption is very high, and, even if there is an intention to perform GPS positioning, there have been problems where GPS positioning is not possible and an emergency report center is unable to acquire information on the reporting party's position.

In addition, there have been cases where a reporting party is unable to operate the emergency report cellular phone in an emergency, or is incapable of making a telephone call, and problems where a reporting party is unable to perform GPS positioning by operating the cellular phone himself or herself, meaning that the emergency report center is therefore unable to acquire information on the reporting party's position.

Moreover, in such cases, although there is a requirement to rapidly rescue a reporting party, or to inform people in the surrounding area that a reporting party is seriously injured, it has not been possible to perform remote control of an emergency report cellular phone using a conventional system, meaning that it has not been possible for an emergency report center to attract the attention of people in the surrounding area through remote control of a siren speaker installed in the emergency report cellular phone.

Further, although this variety of emergency report cellular phone is equipped with a siren output function for performing notification to the surrounding area of a state of emergency, when the siren function is ON in a conventional emergency report cellular phone with a siren function, data communications have not been possible. This is because, upon performing data communications when the siren function is ON, data of such data communications has previously been destroyed by the output of the siren, meaning that data could not be correctly received.

Additionally, in a case where, for whatever reason, a connection with respect to an emergency report center cannot be performed smoothly, there is a requirement to take measures to rapidly perform connection processing with respect to an emergency report center. For example, as far as AMPS is concerned, as utilized by mobile telephone services in North America, two carrier networks provided by telecommunications companies are present, that are a system A and a system B, and a user pre-records either or both of these telecommunications company systems as a home system. Ordinarily, it is possible to connect to a home system without difficulty, but there are cases where, depending on the region, it is not possible to connect to a home system for one reason or another. In such a case, since the user is required to manually switch to and use a different carrier system, an improvement to such a system is required to allow the system to be used for reporting emergencies.

Furthermore, even in a case where a line is connected with an emergency report center, when, in the course of a telephone call with the emergency report center, the line is disconnected for whatever reason, it is necessary to perform a smooth reconnection with the emergency report center. Since, depending on the connection party, microphone sensitivity and speaker audio levels sometimes differ, there is also a requirement to automatically modify such levels to optimum values. A problem also exists in that, when, in order to attract the attention of people in the surrounding area, a telephone call is made when the siren speaker is sounding, the telephone call becomes difficult, and there is deterioration of the electromagnetic wave reception state.

Also, a GPS receiver receives GPS signals such as ephemeris data (orbital information) and almanac data (satellite clock), which are transmitted from satellites, captures satellites, and calculates degrees longitude and latitude for a positioning point. In a case where the power source of a GPS receiver is OFF for a long period, or in a case where it has not been possible to receive almanac data or the like from satellites over a relatively long period, in order for the GPS receiver to perform GPS positioning, same is required to once again download almanac data or the like from satellites.

Since the object is that the emergency report cellular phone should make an emergency report to an emergency report center when a reporting party finds himself or herself in a state of emergency, the emergency report cellular phone is not required to await the arrival of signals, meaning that, in a standby state, the power source of both the wireless communications section and the GPS receiver is OFF. As a result, when, at the time of an emergency report, the power source of the GPS receiver is first ON and GPS positioning is performed, satellite capture takes time, and, because all data required for the GPS positioning must be downloaded from satellites, it is not possible to rapidly perform GPS positioning in an emergency. For this reason, a technology has been proposed by Japanese Patent Application Laid-open No. 2001-4735 which seeks to shorten the GPS positioning time by pre-storing satellite positional information.

However, when the location corresponding to satellite positional information stored in an emergency report cellular phone and the location of the actual GPS positioning point are very far apart, there is the problem that a period for capture of the satellite is required and therefore GPS positioning takes time. Also, when breakdown of the GPS receiver has occurred, or, in a location from which the capture of satellites is difficult, GPS positioning is performed, a long period for GPS positioning is required, meaning that it is not possible to rapidly transmit longitudinal and latitudinal information to the emergency report center. A design is therefore required to rapidly perform GPS positioning in a state of emergency.

Furthermore, with a conventional emergency report cellular phone, when same is not actually being used, it is not possible to confirm the residual battery capacity, or breakdown or other such state of the GPS receiver. Therefore, even when there is an intention to make crucial use of the cellular phone in an emergency, cases have been known where the residual battery capacity is limited or it is not possible to use the GPS receiver because the GPS receiver has broken down, for example. It is therefore desirable to provide a means making it possible to confirm the residual battery capacity in advance in readiness for emergency reporting.

Further, a conventional emergency report cellular phone containing a GPS receiver would judge whether or not a GPS receiver was operating correctly according to whether, with respect to a positioning request from a system controller to the GPS receiver, positioning information was sent back within a fixed period. However, in a case where positioning information is not sent back within a fixed period, such a method is incapable of distinguishing the source of the problem as being the physical connection between the GPS receiver and the system controller, or as being attributable to the positional relationship between the GPS receiver and the satellites.

When the problem lies with the former physical connection, diagnosis of this problem takes a maximum of ten seconds to complete. However, when the problem is attributable to the latter positional relationship, diagnosis of this problem requires a maximum of five minutes. For this reason, even if the problem lies with the former physical connection, with the conventional method, judgement of whether the GPS receiver is in a normal condition then necessitates a period that approaches a maximum of two minutes. As a result, it is desirable to establish a technique that makes it possible to rapidly judge whether the GPS receiver is in a normal condition.

Also, such an emergency report cellular phone is undesirable, since, when a connection is made with an emergency report center via a wireless line and GPS positioning is performed in the course of a telephone call, there is mutual interference between AMPS wireless electromagnetic waves and GPS electromagnetic waves.

An object of the present invention is therefore to propose an emergency report cellular phone to ensure the safety of a reporting party when an emergency report is to be made.

Specifically, an object of the present invention is to propose an emergency report cellular phone that performs operations required for the rescue of a reporting party through remote control from an emergency report center.

It is another object of the present invention to propose an emergency report cellular phone that is capable of performing data communications correctly in a state in which the siren function thereof is ON.

It is yet another object of the present invention to propose an emergency report cellular phone that preserves the safety of a reporting party by reliably performing connection processing for a communications line with an emergency report center when an emergency report is to be made.

It is yet another object of the present invention to propose an emergency report cellular phone that preserves the safety of a reporting party by enabling a smooth telephone call with an emergency report center.

It is yet another object of the present invention to propose an emergency report cellular phone that is capable of reliably and rapidly performing stable GPS positioning.

SUMMARY OF THE INVENTION

With a view to resolving the above-mentioned objects, the emergency report cellular phone according to the present invention comprises: a wireless receiving section, which receives a position recalculation request command message which has been sent from an emergency report center via an analog wireless line and converted into a DTMF signal; a DTMF decoder, which decodes the DTMF signal thus received by the wireless receiving section; a system controller, which parses the position recalculation request command message thus decoded by the DTMF decoder; a GPS receiver, which, in response to a request from the system controller, performs GPS positioning to acquire positional information; a DTMF encoder, which converts the positional information into a DTMF signal; and a wireless transmitting section, which transmits the positional information thus converted into a DTMF signal by means of the DTMF encoder to the emergency report center via an analog wireless line.

The emergency report cellular phone according to the present invention comprises: a wireless receiving section, which receives a siren speaker activation request command message which has been sent from an emergency report center via an analog wireless line and converted into a DTMF signal; a DTMF decoder, which decodes the DTMF signal thus received by the receiving section; a system controller, which parses the siren speaker activation request command message thus decoded by the DTMF decoder; and a siren speaker, which, in response to a command from the system controller, outputs a predetermined sound signal.

The emergency report cellular phone according to the present invention comprises: a wireless receiving section, which receives a speaker phone activation request command message which has been sent from an emergency report center via an analog wireless line and converted into a DTMF signal; a DTMF decoder, which decodes the DTMF signal thus received by the receiving section; a system controller, which parses the speaker phone activation request command message thus decoded by the DTMF decoder; and a speaker phone, which, by means of an ON operation in response to a request from the system controller, enables a reporting party to interact with the emergency report center.

The emergency report cellular phone according to the present invention comprises: a wireless receiving section, which receives a mobile state request command message which has been sent from an emergency report center via an analog wireless line and converted into a DTMF signal; a microphone and a speaker, which are employed for interaction with an emergency report center and which implement a speaker phone function; a power source circuit, which converts electric power supplied by a battery into a predetermined operating voltage; a DTMF decoder, which decodes the DTMF signal thus received by the receiving section; a system controller, which parses the mobile state request command message thus decoded by the DTMF decoder to determine at least one of the residual battery capacity, the received electromagnetic wave strength of the wireless receiving section, and the state of the microphone and/or speaker; a DTMF encoder, which converts the information in relation to the states of the device thus determined by the system controller into a DTMF signal; and a wireless transmitting section, which transmits the information in relation to the state of a device thus converted into a DTMF signal by means of the DTMF encoder to the emergency report center via an analog wireless line.

The emergency report cellular phone according to the present invention comprises: a microphone and a speaker, which are employed for interaction with an emergency report center and which implement a speaker phone function; a siren for notification of a state of emergency; a drive section, which, so that a reporting party interacts with the emergency report center by means of the speaker phone function, intermittently drives the siren; and a wireless communications section, which, when the siren function of the siren is ON, and at a time when the siren is not being driven, performs data communications with the emergency report center via an analog wireless line.

The emergency report cellular phone according to the present invention comprises: a system controller containing a siren intermittent drive section for intermittently driving a siren, and a communications enable signal generating section, which, on the basis of an intermittent siren drive signal, outputs a communications enable signal; a memory, which stores information for connections; a cellular transceiver section, which connects to a cellular system to transmit and receive data and/or voice signals; a voice processing section, which contains a DTMF encoder for data communications and which is for voice communications with the emergency report center via the cellular system; a DTMF decoder, which decodes DTMF signals transmitted from the emergency report center and then outputs the decoded result to the system controller; a speaker and a microphone, which are connected with the voice processing section; and a siren, which is driven by the intermittent siren drive signal and which performs notification of a state of emergency to the surrounding area, wherein, even in a state in which the siren function is ON on the basis of the communications enable signal, the emergency report cellular phone performs data communications at a time when the siren is not being driven.

The emergency report cellular phone according to the present invention comprises: a system controller, which contains a connection system switching section for connecting to a plurality of cellular systems; a memory, which stores information for connections; a cellular transceiver section, which connects to a cellular system to transmit and receive data and/or voice signals; a voice processing section, which contains a DTMF encoder for data communications by means of DTMF signals, and which is for voice communications with the emergency report center via a cellular system; a DTMF decoder, which decodes the DTMF signal transmitted from the emergency report center and then outputs the decoded result to the system controller; a microphone and a speaker, which are connected with the voice processing section; a siren, which performs notification of a state of emergency; and a timer for judging processing time out, wherein the memory stores system A connection information, system B connection information, and a maximum connection frequency, and the connection system switching section uses a system A and a system B on the basis of the content of the memory and the output of the timer and following a predetermined procedure, so that, while the connection system switching section performs connection processing with respect to a preset first telephone number, when connection with respect to the first telephone number is not possible, same performs connection processing with respect to a preset second telephone number.

The emergency report cellular phone according to the present invention comprises: a system controller, which contains a connection system switching section for connecting to a plurality of cellular systems; a memory, which stores information for connections; a cellular transceiver section, which connects to a cellular system to transmit and receive data and/or voice signals; a voice processing section, which contains a DTMF encoder for data communications by means of DTMF signals, and which is for voice communications with the emergency report center via a cellular system; a DTMF decoder, which decodes DTMF signals transmitted from the emergency report center and then outputs the decoded result to the system controller; a microphone and a speaker, which are connected with the voice processing section; and a siren, which performs notification of a state of emergency, wherein, in a case where a wireless line connected with an emergency report center is disconnected as a result of a communications error, the connection system switching section automatically performs connection with respect to an emergency report center.

The emergency report cellular phone according to the present invention comprises: a system controller, which contains a connection system switching section for connecting to a plurality of cellular systems; a memory, which stores information for connections; a cellular transceiver section, which connects to a cellular system to transmit and receive data and/or voice signals; a voice processing section, which contains a DTMF encoder for data communications by means of DTMF signals, and which is for voice communications with the emergency report center via a cellular system; a DTMF decoder, which decodes DTMF signals transmitted from the emergency report center and then outputs the decoded result to the system controller; a microphone and a speaker, which are connected with the voice processing section; and a siren, which performs notification of a state of emergency, wherein, in a case where a DTMF signal is received from the emergency report center, the voice processing section turns OFF the audio output of the speaker.

The emergency report cellular phone according to the present invention comprises: a system controller, which contains a connection system switching section for connecting to a plurality of cellular systems; a memory, which stores information for connections; a cellular transceiver section, which connects to a cellular system to transmit and receive data and/or voice signals; a microphone and a speaker, which are for making a voice call with an emergency report center; a voice processing section, which contains a gain controller that adjusts the gain of the microphone and speaker; and a siren, which performs notification of a state of emergency, wherein the system controller issues a command to the gain controller to adjust the optimum value of a speaker audio output level and/or of microphone sensitivity suited to a connection party, and, the gain controller, in accordance with the command, sets the speaker audio output level and/or microphone sensitivity to an optimum value.

The emergency report cellular phone according to the present invention comprises: a storage section, which stores satellite positional information for when GPS positioning was performed on a previous occasion; a GPS positioning section, which captures satellites by referencing the satellite positional information to perform GPS positioning on the basis of GPS signals from satellites, and, in a case where GPS positioning is completed within a fixed period, which stores the latest satellite positional information in the storage section, and, in a case where GPS positioning is not completed within a fixed period, which restores the satellite positional information stored in the storage section to initial values; and a wireless communications section, which connects to an emergency report center via a wireless line to make an emergency report and to transmit longitudinal and latitudinal information for a positioning point to the emergency report center.

The emergency report cellular phone according to the present invention comprises: a storage section, which stores satellite positional information for when GPS positioning was performed on a previous occasion; a GPS positioning section, which captures satellites by referencing the satellite positional information to perform GPS positioning on the basis of GPS signals from satellites, and, in a case where GPS positioning is completed within a fixed period, which stores the latest satellite positional information in the storage section, and, in a case where GPS positioning is not completed within a fixed period and when the number of satellites captured is three or more, which restores the satellite positional information stored in the storage section to initial values, and when the number of satellites captured is two or less, outputs non-positioning information; and a wireless communications section, which connects to an emergency report center via a wireless line to make an emergency report and to transmit longitudinal and latitudinal information for a positioning point to the emergency report center.

The emergency report cellular phone according to the present invention comprises: a storage section, which stores satellite positional information for when GPS positioning was performed on a previous occasion; a GPS positioning section, which captures satellites by referencing the satellite positional information to perform GPS positioning on the basis of GPS signals from satellites, and, in a case where GPS positioning is completed within a fixed period, which stores the latest satellite positional information in the storage section, and, in a case where GPS positioning is not completed within a fixed period and when the number of satellites captured is four or more, is reactivated, and when the number of satellites captured is three or less, which restores the satellite positional information stored in the storage section to initial values; and a wireless communications section, which connects to an emergency report center via a wireless line to make an emergency report and to transmit longitudinal and latitudinal information for a positioning point to the emergency report center.

The emergency report cellular phone according to the present invention, which is equipped with a GPS receiver that receives GPS signals from satellites to calculate degrees longitude and latitude for a positioning point, and a wireless communications section that transmits longitudinal and latitudinal information outputted from the GPS receiver to an emergency report center via a wireless line, further comprises: a warning section, which, on the basis of a instruction optionally given by a user at a time other than when an emergency report is being made, checks whether or not data communications between the GPS receiver and the wireless communications section are normal, and, in a case where the data communications are normal, also checks whether or not the GPS receiver is capable of completing GPS positioning within a fixed period, and, in a case where the data communications are not normal or the GPS positioning cannot be completed within a fixed period, issues a warning to that effect.

BRIEF DESCRIPTION OF THE DRAWINGS

FIG. 3 is a block diagram of the functions of an emergency report cellular phone according to the present invention;

DESCRIPTION OF THE PREFERRED EMBODIMENTS

First Embodiment

Figure 2:
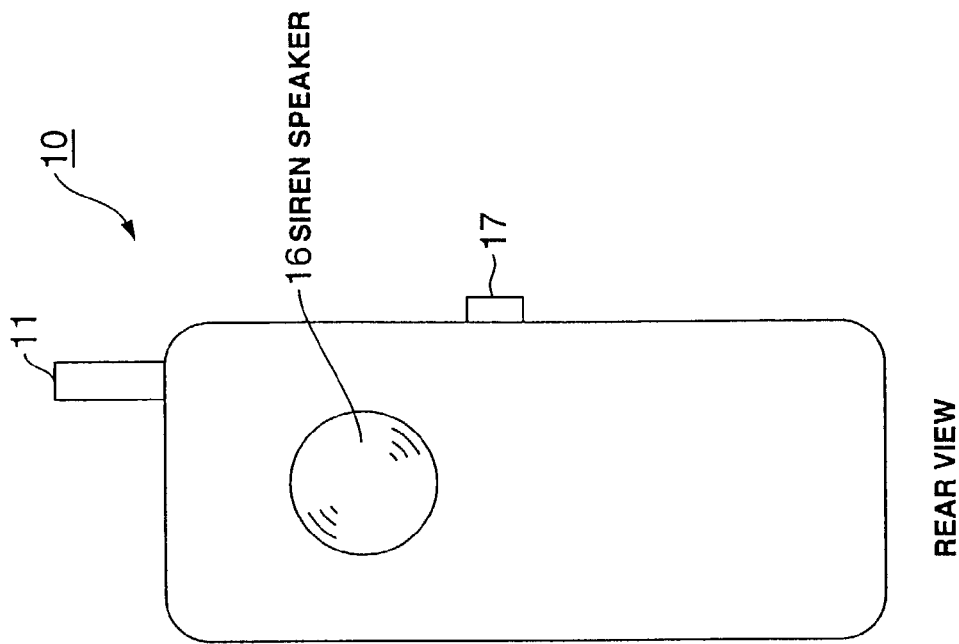
FIG. 2 is a rear view of an emergency report cellular phone according to the present invention.
Figure 1:
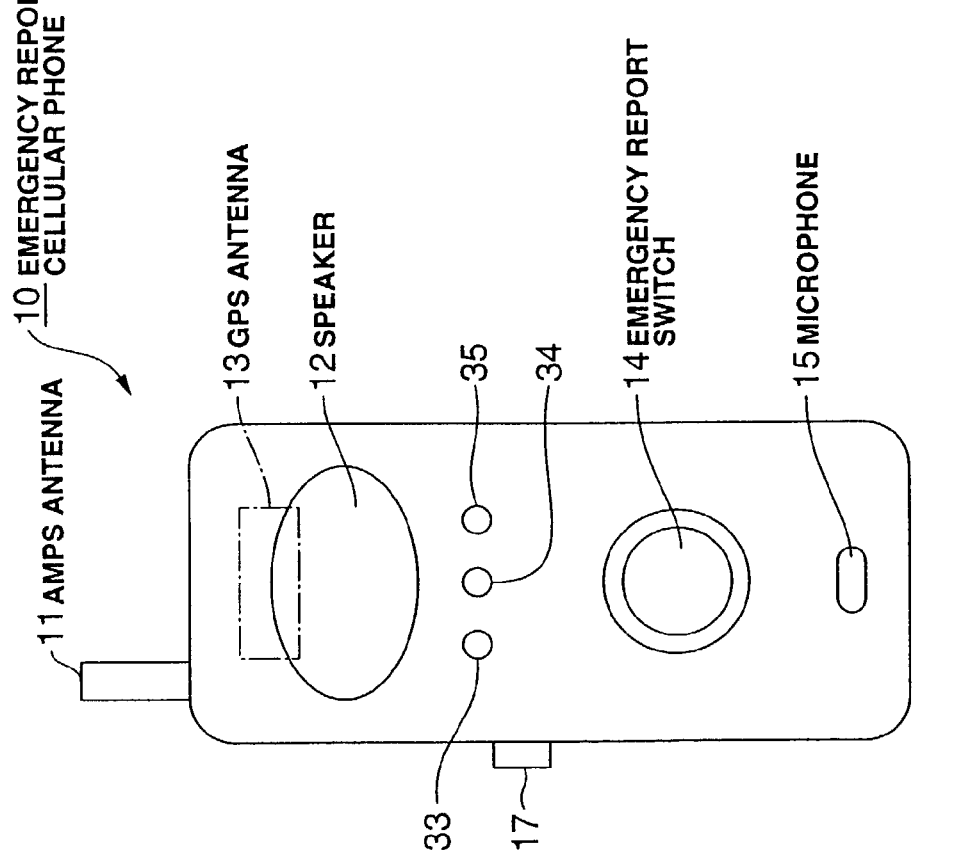
FIG. 1 is a front view of an emergency report cellular phone according to the present invention.

FIG. 1 is a front view of an emergency report cellular phone, and FIG. 2 is a rear view of the same cellular phone. In these same figures, 10 is an emergency report cellular phone; 11 is an AMPS (Advanced Mobile Phone Service) antenna; 12 is a speaker; 13 is a GPS antenna; 14 is an emergency report switch; 15 is a microphone; 16 is a siren speaker; 17 is a self-diagnosis switch; 33 to 35 are LEDs (light-emitting diodes), which are constituted so as to be capable of lighting up in accordance with self-diagnosis results. As shown in these same figures, the emergency report switch 14 is disposed on the emergency report cellular phone 10 in a position that enables the reporting party to easily depress this switch, and a ten-key, or the like, for the inputting of telephone numbers is not disposed on this cellular phone. The emergency report cellular phone 10 is constituted with a structure in which a GPS receiver is attached to a wireless communications terminal.

The emergency report cellular phone 10 is constituted such that, in a state of emergency, when a reporting party depresses the emergency report switch 14 for approximately one second, the emergency report cellular phone 10 makes an emergency report via a mobile communications network to an emergency report center which has been previously recorded in the memory, and by means of remote control from the emergency report center, transmits longitudinal and latitudinal information acquired via a GPS receiver to an emergency report center. On the basis of the longitudinal and latitudinal information thus received, the emergency report center is able to determine the position of the reporting party and display this information on a display. As shown in the figure, a siren speaker 16 is provided at the rear of the emergency report cellular phone 10, it being possible to drive this siren speaker 16 by means of remote control from the emergency report center to thereby attract the attention of people in the vicinity of the reporting party. The remote control of the emergency report cellular phone 10 will be described in detail hereinbelow.

FIG. 3 is a block diagram of the functions of the emergency report cellular phone 10. The emergency report cellular phone 10 is principally constituted from a wireless communications section 20 and a GPS receiver 30. The wireless communications section 20 is a module for performing wireless communications with the emergency report center and is principally constituted having an RF section (wireless section) 21, an audio processor 22, and a system controller 26. The RF section 21 amplifies wireless frequency signals received from an analog communications channel via the AMPS antenna 11, and converts these signals to intermediate frequencies using a reception mixer, whereupon the RF section 21 amplifies these intermediate frequency signals by means of an IF amplifier and then supplies same to the audio processor 22. The audio processor 22 is a circuit that performs analog voice processing and regenerates the intermediate frequency signals as analog call receive signals by means of FM demodulation. After these analog call receive signals have been amplified via an amplifier, these signals are outputted by a speaker 12.

On the other hand, call transmit signals of a caller inputted from a microphone 15 are amplified by an amplifier, whereupon same are inputted to the audio processor 22 and thus FM-modulated. The FM-modulated signals are outputted to the RF section 21. Next, in a transmission mixer, the modulated signals are up-converted to wireless frequency signals by being mixed with signals issued by a transmission station in accordance with a wireless frequency of an analog call channel outputted from a frequency synthesizer, and these modulated signals are then amplified using a transmission electric power amplifier to a predetermined output level. The amplified wireless frequency signals are emitted as electromagnetic waves via the AMPS antenna 11. The speaker 12 and the microphone 15 comprise a speaker phone function such that a reporting party is able to make a telephone call to an emergency report center without holding the emergency report cellular phone 10.

The audio processor 22 comprises a gain controller 23 for adjusting an output level of the speaker 12 and the sensitivity of the microphone 15, and a DTMF encoder 24, which simultaneously outputs signals of a low frequency (697 Hz, 770 Hz, 852 Hz, 941 Hz) and of a high frequency (1209 Hz, 1336 Hz, 1477 Hz, 1633 Hz), and which is for generating DTMF (Dual Tone Multi Frequency) signals that correspond to the numeric characters, alphabetical characters and symbols 0 to 9, A to D, * and #. The DTMF encoder 24 converts longitudinal and latitudinal information obtained from the GPS receiver 30 and information in relation to the residual battery capacity, the received electromagnetic wave strength, and the like, of the emergency report cellular phone 10, into DTMF signals, to utilize same at the time of a transmission to an emergency report center via the RF section 21 (described in detail hereinbelow).

Furthermore, upon receiving DTMF signals which have been transmitted from an emergency report center, the audio processor 22 transfers these DTMF signals to a DTMF decoder 25, and these signals are decoded and then outputted to the system controller 26. These DTMF signals transmitted from an emergency report center contain a command for remote control of the emergency report cellular phone 10, and a hello tone (DTMF "#1#") or similar to establish a call link.

The system controller 26 is a control circuit that performs control of the transmit/receive sequence operation and control of the transmit/receive protocol in the RF section 21 and the audio processor 22, or the like, and comprises a memory 27 for storing contacts (a first telephone number and a second telephone number) for an emergency report center, and for storing longitudinal and latitudinal information obtained from the GPS receiver 30, or other information. In addition, the system controller 26 is connected with a shock sensor 29 for detecting a collision caused by the user's wheelchair turning over, for example, with a siren speaker 16 for attracting the attention of people in the vicinity of the user, and with an emergency report switch 14. In a case where the shock sensor 29 detects a collision, even if the emergency report switch 14 is not depressed, the constitution is such that a report is automatically made with respect to a contact stored in the memory 27.

The power source circuit 31 generates a predetermined operating power source voltage $V_{cc}$ based on the output of the battery 28, and supplies this predetermined operating power source voltage to each circuit. The system controller 26 also functions as a residual battery capacity detecting means. The GPS receiver 30 captures and receives spectrum diffused and modulated C/A codes sent from four GPS satellites of a total of twenty-four GPS satellites circum-navigating the globe, and, by correlating the C/A code sent from each GPS satellite and the C/A code generated by the GPS receiver 30, the GPS receiver acquires longitudinal and latitudinal information corresponding to the current position of the emergency report cellular phone 10 and outputs this information to the system controller 26.

By using the emergency report cellular phone 10, a user is able to contact an emergency report center to report a state of emergency and learn of his or her geographical position. Moreover, when people are dispatched to the user's location, it is possible to keep the provision of information required by the user to a minimum. When the emergency report cellular phone 10 is activated, a regional code and NNX number pre-stored in the memory 27 are reported to an emergency report center via a regional cellular system. Once connection with the emergency report center is complete, the transmission of user identification information is requested by the emergency report center, and, in order for the reporting party to be determined, identification information (MIN, ESN) is transmitted from the emergency report cellular phone to the emergency report center. When the reporting party identification information is received, a telephone call between the reporting party and a worker of the emergency report center is enabled by opening a cellular traffic channel.

This emergency report cellular phone 10 has the following five operating modes:
Power source disconnect mode
Emergency report mode
Dial 911 mode
Panic mode
Self-diagnosis mode (1) Power Source Disconnect Mode In power source disconnect mode, all the circuits of the cellular phone are disconnected in order to economize on the consumption of the battery 28. When predetermined keys are depressed in power source disconnect mode, the cellular phone 10 assumes different operating modes in accordance with inputs made.

(2) Emergency Report Mode

In emergency report mode, a reporting party is able to operate the cellular phone 10 to make a telephone call, for voice communications, to transmit and receive DTMF messages, and end a telephone call. The reporting party is able to make an emergency report by pressing an emergency report switch 14. Thereupon, the emergency report cellular phone 10 may establish a call link via a plurality of cellular systems. When there are two usable systems, namely system A and system B, the emergency report cellular phone 10 first attempts to place a call via system A. Should this prove impossible, the cellular phone 10 switches the system used and then attempts to place a call via system B.

When a connection with the emergency report center is established, the emergency report center sends an identification request command to the emergency report cellular phone 10. Thereafter, identification information for the reporting party is converted to a DTMF tone, sent to the emergency report center to enable a worker of this same center to identify the reporting party in question. The emergency report cellular phone 10 uses a home system to start dialing and searches for the control channel with the strongest signal level. When a signal of suitable strength exists, the call is made via this home system. However, if a suitable control channel is not found or a transmission error occurs, the emergency report cellular phone 10 redials. After four attempts have been made, the emergency report cellular phone 10 switches to another system and searches for a suitable control channel there. The emergency report cellular phone 10 thus attempts to establish a connection with system A and system B alternately. After five attempts have been made, attempts to establish a connection are halted.

The emergency report cellular phone 10 contains a speaker phone and therefore permits voice communications between a reporting party and an emergency report center worker. In an emergency, a reporting party may be in a condition in which he or she is not capable of making a telephone call, or the emergency report cellular phone 10 may have dropped onto the ground. However, if there is a speaker phone, at least the emergency report center worker is able to listen to a reporting party's voice. Moreover, even if the reporting party is not able to hold the emergency report cellular phone 10 to his or her ear, he or she is able to make a telephone call with an emergency report center worker. The emergency report cellular phone 10 may also be controlled by the emergency report center by means of DTMF command messages.

Upon detecting a call from the emergency report cellular phone 10, the emergency report center transmits an identification request command. The emergency report cellular phone 10 waits a predetermined period (thirty seconds) from the time the call is made until the identification request command has been received. When the connection is broken by the timer, the emergency report cellular phone 10 performs a second call operation. In a case in which five calls have been attempted but an identification request command has not been received from the emergency report center, connection processing is interrupted.

Meanwhile, when the emergency report cellular phone 10 has completed a connection with the emergency report center, communications are performed by means of a Point-to-Point DTMF protocol. The emergency report center sends a position recalculation request command message in order to determine the position of the emergency report cellular phone 10. The emergency report cellular phone 10 receives this command, executes GPS positioning and sends back longitudinal and latitudinal information in response. The GPS signal acquisition conditions are also included in this response. If the emergency report cellular phone 10 is not able to perform GPS positioning within a fixed period, the emergency report cellular phone 10 transmits positional information pre-stored in the memory to the emergency report center.

As a result of the emergency report cellular phone 10 activating the microphone and speaker (speaker phone) in response to the speaker activation request command message sent from the emergency report center, the voice mode is enabled. Further, by means of suspension of the microphone and speaker in response to a speaker suspension request command message sent from the same center, the voice mode is canceled.

The siren of the emergency report cellular phone 10 is capable of being activated/suspended in response to a siren activation/siren suspension request command message sent from the emergency report center. Upon receiving a siren activation request command message, the emergency report cellular phone 10 causes an emergency siren to sound for five minutes. While the siren is sounding, the speaker phone is suspended. Even when the siren has ended, the reporting party is unable to sound the siren by means of a manual operation. Therefore, for the siren output to be turned ON, it is necessary for a siren activation request command message to be sent from the emergency report center to the emergency report cellular phone 10. The periods for the siren are: ON: two seconds, and OFF: eight seconds. The emergency report cellular phone 10 decodes the DTMF message while the siren is suspended.

The emergency report center is able to request the emergency report cellular phone 10 to perform a recalculation of position, through the use of a position recalculation request command message. Upon receiving a position recalculation request command message, the emergency report cellular phone 10 halts the current telephone call, suspends the AMPS receiver, and activates the GPS receiver, and then calculates the current position. The emergency report cellular phone 10 attempts to calculate this position within a time frame contained in the position recalculation request command message. In a case in which the emergency report cellular phone 10 has calculated the latest positional information, or time out occurs, the emergency report cellular phone 10 attempts to place a call once again. When the GPS receiver has been unable to calculate the latest positional information within this time frame, the emergency report cellular phone 10 communicates the latest positional information stored in the memory to the emergency report center.

In a case in which it is desired to learn of a state of the emergency report cellular phone 10, the emergency report center is able to acquire this information by using a mobile status request command message. Examples of such a state include an RSSI state, battery state, speaker state and siren state.

In order to end a telephone call with the emergency report cellular phone 10, the emergency report center sends an interrupt request command message. Upon receiving the interrupt request command message, the emergency report cellular phone 10 disconnects the telephone line and turns OFF the power supply after approximately five seconds. However, in a case in which the emergency report cellular phone 10 receives a siren activation request command message before receiving an interrupt request command message, the emergency report cellular phone 10 does not cut the power supply immediately, but instead cuts the power supply once the siren output has ended.

(3) Dial 911 Mode

The emergency report center is able to instruct the emergency report cellular phone 10 to dial an emergency number (911) by sending a dial 911 request command message. Upon receiving the dial 911 request command message, the emergency report cellular phone 10 ends the telephone call with the emergency report center and dials 911. Next, the speaker phone function is turned ON for the 911 telephone call. Termination of the telephone call can be made at any stage after the telephone call has been initiated by depressing the emergency report switch 14 for one second or more.

(4) Panic Mode

When the emergency report cellular phone 10 is in Power source disconnect mode, electric power may be supplied to the emergency report cellular phone 10 by depressing the siren sounding button for approximately four seconds, whereby the panic mode is assumed. Once the power supply of the cellular phone is ON, initially all the LEDs of the cellular phone light up and an electronic sound is emitted to announce that the power supply is now ON. Thereafter, the emergency siren sounds. Next, the emergency siren is suspended by pressing the siren sounding button continuously for one second. A 911 telephone call is performed by pressing the emergency report switch 14 for one second during operation of the emergency siren, and then the emergency siren is suspended.

The emergency report cellular phone 10 is capable of performing data communications with the emergency report center via an AMPS cellular network by employing a Point-to-Point DTMF protocol. The emergency report center is capable of controlling the emergency report cellular phone 10 by sending a variety of command messages. The emergency report cellular phone 10 awaits the receipt of command messages, processes these commands and then performs suitable processing. Commands sent to the emergency report cellular phone 10 are selected in accordance with circumstances. For example, for a voice mode telephone call, in order to activate the speaker phone, a speaker activation request command message may be sent, and in order to ask people in the vicinity of the emergency report cellular phone 10 for assistance, a siren activation request command message may be sent.

(5) Self-diagnosis Mode

When the emergency report cellular phone 10 is in Power source disconnect mode, by depressing the self-diagnosis button for one second, it is possible to perform self-diagnosis in relation to states of the device.

Figure 4:
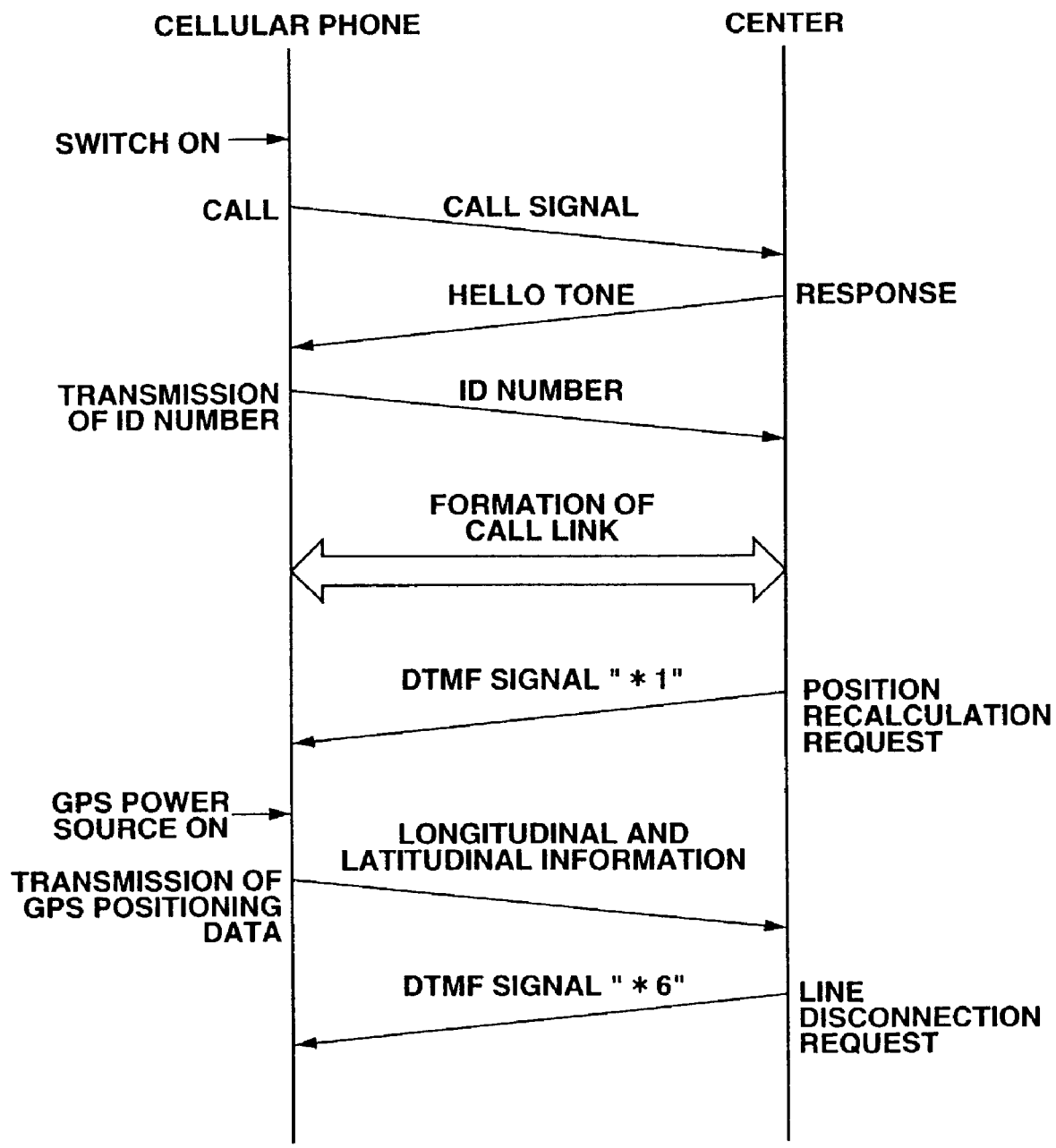
FIG. 4 is a figure to show communications between an emergency report cellular phone and an emergency report center, according to the present invention.

Next, a description will be provided with regard to the procedure for communications between an emergency report center and the emergency report cellular phone 10, and also with regard to remote control of this same cellular phone. FIG. 4 is a figure to show communications between the emergency report center and the emergency report cellular phone 10 when a report is being made. In an emergency, when the emergency report switch 14 is depressed, the power source of the wireless communications section 20 is then ON, and a call request is performed with respect to an emergency report center contact stored in the memory 27. When the emergency report center receives a call number, same sends a hello tone by means of a DTMF signal as a response message. Upon receiving the hello tone, the emergency report cellular phone 10 holds this hello tone in the memory 27. An ID number, which is a serial number unique to the emergency report cellular phone 10, is converted into a DTMF signal by the DTMF encoder 24 and then sent to the emergency report center. The emergency report center is thus able to determine the owner of the emergency report cellular phone 10 and a call link may therefore be formed between both parties.

The emergency report center conducts a telephone call with the emergency reporting party via a call channel to confirm the physical state of the reporting party. Thereafter, with the intention of determining the position of the reporting party, the emergency report center sends a position recalculation request command message to the reporting party. The position recalculation request command message is a command to the emergency report cellular phone 10 requesting same to perform GPS positioning and then send longitudinal and latitudinal information to the emergency report center, and this command message corresponds to a DTMF signal "*1". The emergency report cellular phone 10, which has received this position recalculation request command message, turns ON the power source of the GPS receiver 30 to perform GPS positioning. The longitudinal and latitudinal information obtained by means of GPS positioning is temporarily stored in the memory 27, whereupon this information is converted into a DTMF signal by means of the DTMF encoder 24 and then sent to the emergency report center.

The emergency report center, which has received this longitudinal and latitudinal information, can determine the position of the reporting party and thus make arrangements for a rescue. Finally, the emergency report center sends an interrupt request command message to disconnect the line. The interrupt request command message is a command to the emergency report cellular phone 10 requesting same to disconnect the line and corresponds to a DTMF signal "*6".

As a result, according to the present invention, since GPS positioning is performed by means of remote control in accordance with requirements, it is not necessary for the power source of the GPS receiver 30 to be ON ordinarily, meaning that consumption of the battery 28 can be kept to a minimum. Moreover, since, if is possible to determine the position of a reporting party by means of interaction with the reporting party, GPS positioning need not necessarily be performed, consumption of the battery 28 can ordinarily be kept to a minimum in comparison with a conventional system for performing GPS positioning.

Figures 5, 6:
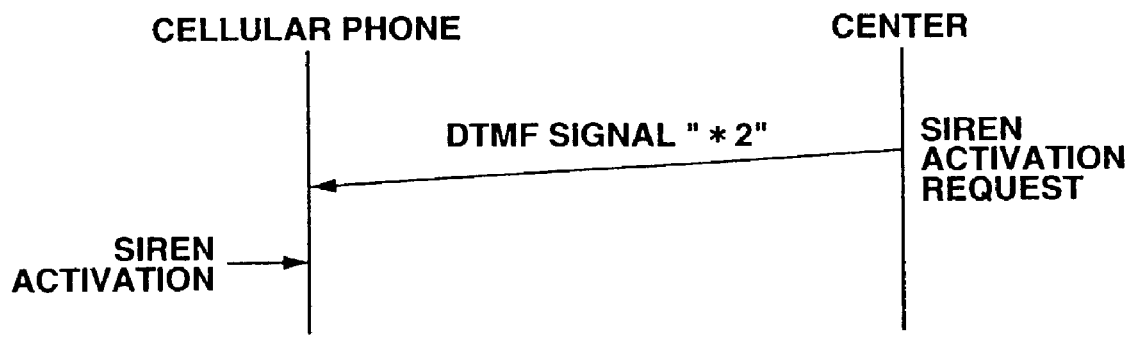
FIG. 5 is a figure to show the corresponding relationships between DTMF command messages and DTMF signals.
FIG. 6 is figure to show communications when a siren speaker is driven by means of remote control.

In addition to the above command, commands (DTMF commands) used by the emergency report center to perform remote control of the emergency report cellular phone 10 by means of DTMF signals include, for example, as shown in FIG. 5, a siren speaker activation/suspension request command message (DTMF "*2") for performing ON/OFF control of the siren speaker 16, a speaker activation/suspension request command message (DTMF "*3") for performing ON/OFF control of the speaker 12, a microphone activation/suspension request command message (DTMF "*4") for performing ON/OFF control of the microphone 15, a mobile state request command message (DTMF "*5") to request the acquisition of information in relation to the residual battery capacity and the received electromagnetic wave strength, of the emergency report cellular phone 10, and to the state of the microphone 15 or the speaker 12 (with regard to breakdown or the like).

Figure 7:
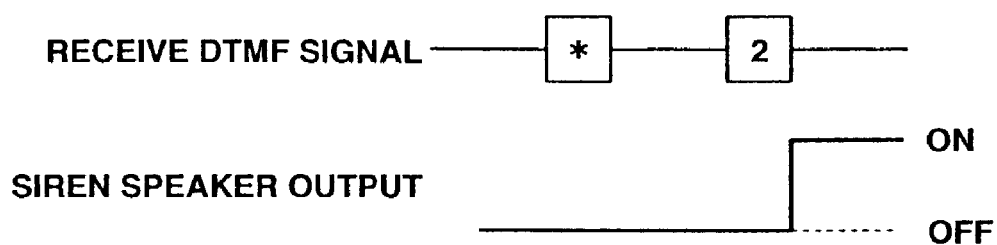
FIG. 7 is an illustrative view of when a siren speaker is driven by means of remote control.
Figure 8:
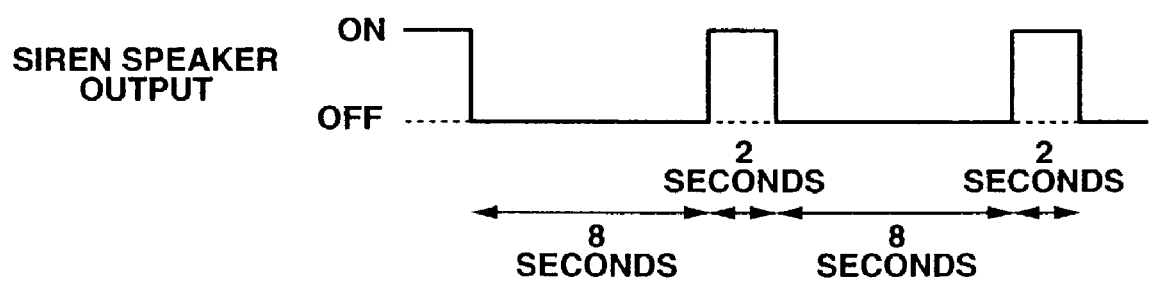
FIG. 8 is an illustrative view of the output of the siren speaker.

For example, in a case where, through interaction with a reporting party, the state of the reporting party is judged to be very poor so as to not permit adequate interaction with same, the call link is cancelled urgently, and a position recalculation request command message is issued to rapidly determine the position of the reporting party, and, by issuing a siren speaker activation/suspension request command message (FIG. 6), it is possible to turn ON the siren speaker 16 (FIG. 7) to thereby attract the attention of people in the surrounding area. FIG. 8 is an illustrative view of an output state when driving the siren speaker 16. As shown in the same figure, through the intermittent repetition of an ON state (for two seconds)/an OFF state (for eight seconds), even in a case where the siren speaker 16 is being driven, by ensuring that a telephone call can be conducted between a reporting party and the emergency report center, it becomes possible to relieve the anxiety of the reporting party, and, moreover, by suppressing the consumption of the battery 28, long usage is made possible.

Further, in the description above, the emergency report center makes a GPS positioning request after forming a call link and thus confirming the state of the reporting party. However, in a case where, on account of the residual battery capacity of the emergency report cellular phone 10 being limited or the received electromagnetic wave strength of same being weak, a long telephone call with a reporting party is undesirable, it is also possible for the formation of a call link to be omitted and for GPS positioning to be requested as a first priority, and for rescue of the reporting party to be attempted avoiding a state in which GPS positioning is impossible due to battery failure or the like.

Figure 9:
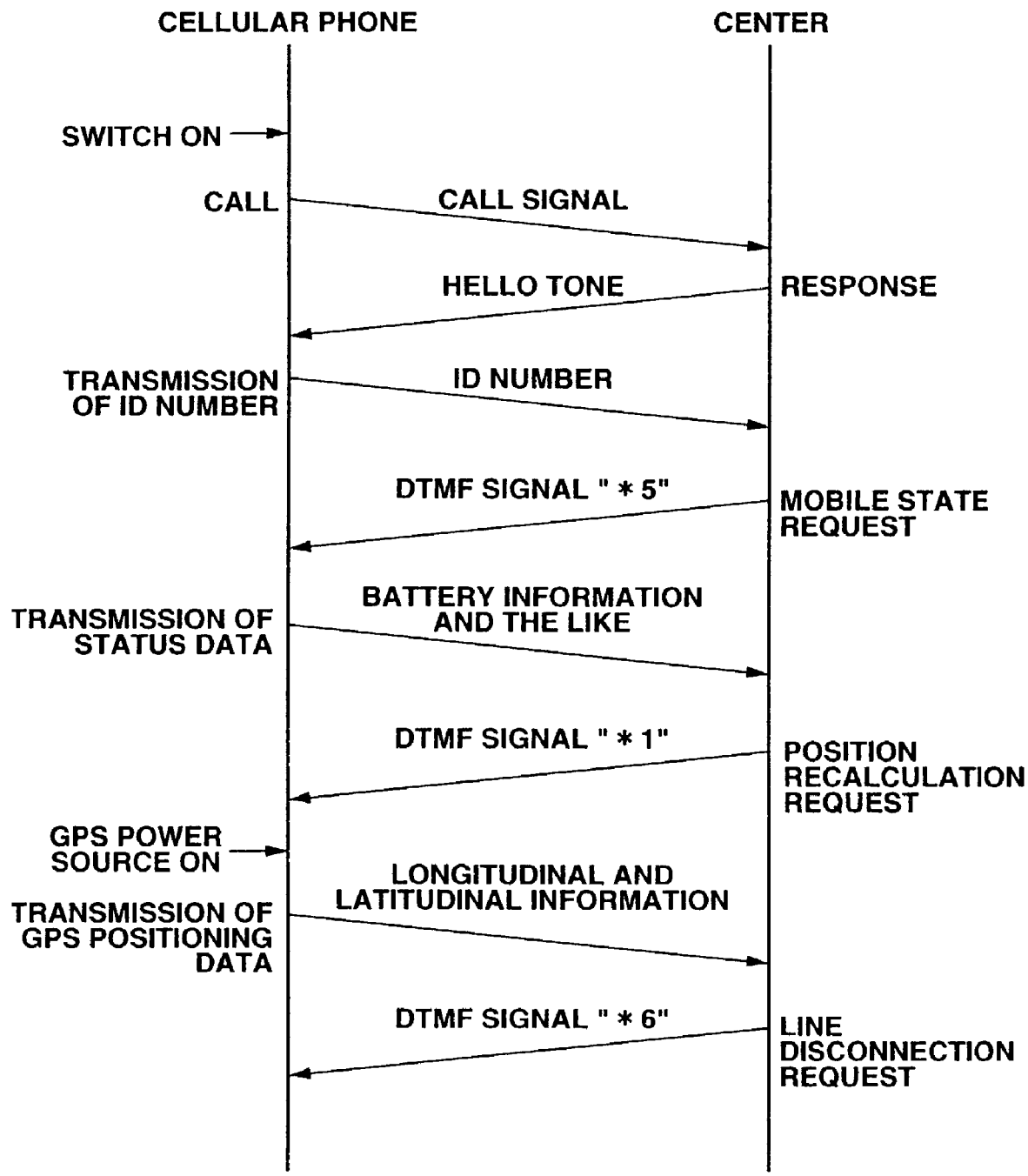
FIG. 9 is a figure to show communications between an emergency report cellular phone and an emergency report center, according to the present invention.

FIG. 9 is a figure to show communications between the emergency report cellular phone 10 and an emergency report center in such a case. In this same figure, the emergency report center, which has received a call signal from the emergency report cellular phone 10, sends a hello tone and thus receives an ID number which is transmitted from the emergency report cellular phone 10. Thereafter, the emergency report center issues a mobile state request command message. The emergency report cellular phone 10, which has received this command, converts information on the residual battery capacity and the received electromagnetic wave strength, and the like, into a DTMF signal, and sends this converted information to the emergency report center. The emergency report center predicts a permissible connection time with the emergency report cellular phone 10 from the information on the residual battery capacity and the received electromagnetic wave strength, and the like, of the emergency report cellular phone 10, and, in a case where the connection time is judged to be short, omits the formation of a call link and issues a position recalculation request command message. Thereupon, the emergency report cellular phone 10 turns ON the power source of the GPS receiver 30 to perform GPS positioning. The longitudinal and latitudinal information determined in this positioning is converted to a DTMF signal and then sent to the emergency report center. Upon receiving this information, the emergency report center issues an interrupt request command message to the emergency report cellular phone 10 to thereby disconnect the line.

According to the present embodiment, since the emergency report cellular phone is such that, in order for GPS positioning to be performed through remote control by an emergency report center, the power source of the GPS receiver need not be ON ordinarily, electric power consumed by the battery can be saved, and, even in a case where a reporting party is unable to perform GPS positioning as a result of his or her poor physical condition, since GPS can be reliably performed, it is possible to ensure the safety of the reporting party.

Furthermore, according to the present embodiment, since the emergency report cellular phone is such that a siren speaker is driven by means of remote control from an emergency report center to notify a third party of a state of emergency, even in a case where a reporting party is unable to drive the siren speaker as a result of his or her poor physical condition, it is possible to attract the attention of a third party.

Additionally, the present embodiment is constituted such that the siren speaker is driven intermittently, and such that interaction is enabled with an emergency report center via a microphone and a speaker when the output of the siren speaker is OFF, meaning that it is possible to save battery power, and, even when the siren speaker is being driven, a telephone call between an emergency report center and a reporting party is possible.

Moreover, according to the present embodiment, since the emergency report cellular phone is such that the ON/OFF of a microphone and/or speaker can be controlled by means of remote control from an emergency report center, even in a case where a reporting party is unable to operate the emergency report cellular phone as a result of his or her poor physical condition, a stable telephone call is made possible.

Also, according to the present embodiment, since an emergency report center is capable of ascertaining the residual battery capacity and the received electromagnetic wave strength of the emergency report cellular phone, and the speaker state or microphone state, it is possible to thus predict the time permitted for a connection with the emergency report cellular phone, and necessary measures can therefore be taken to ensure the safety of a reporting party.

Second Embodiment

Figure 10:
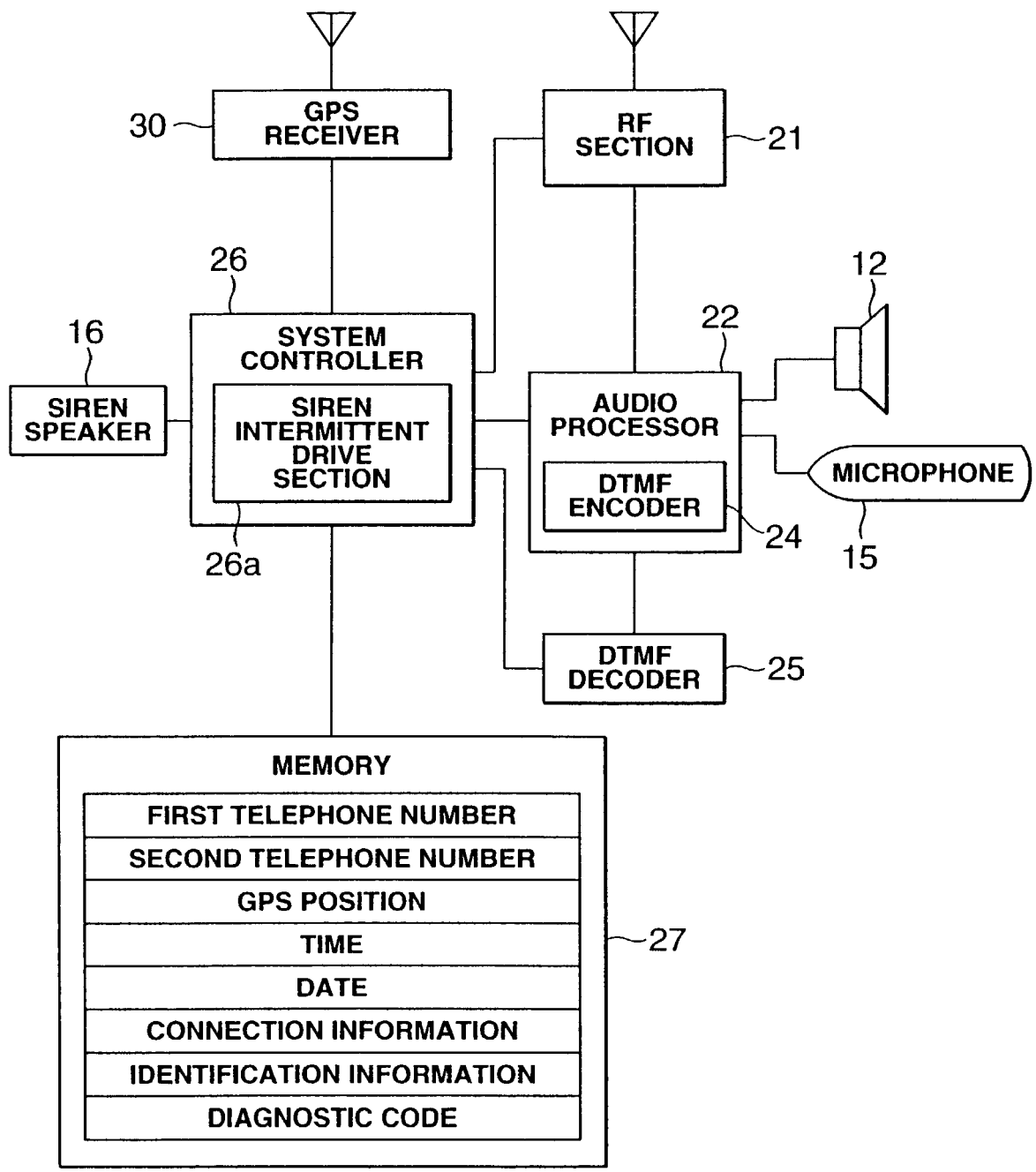
FIG. 10 is a block diagram of the functions of an emergency report cellular phone according to the present invention.

FIG. 10 is a block diagram of the functions of an emergency report cellular phone relating to the present embodiment. In this same figure, 30 is a GPS receiver for acquiring positional information, of the present device, and 26 is a system controller. The system controller 26 comprises a siren intermittent drive section 26a for intermittently driving a siren speaker 16. The siren intermittent drive section 26a performs the control required to enable data communications at a predetermined time (while the siren speaker 16 is temporarily OFF), even in a state in which the siren function is ON (described in detail hereinbelow).

A communications enable signal is sent to the above-described audio processor 22, the DTMF encoder 24, and the DTMF decoder 25. 27 is a memory for storing information for connections, positional information, for example; 21 is an RF section for a connection with a cellular system, and for transmitting and receiving data and/or sound signals; 22 is an audio processor for voice communications with an emergency report center via a cellular system. The audio processor 22 comprises the DTMF encoder 24 for data communications. 25 is a DTMF decoder, which decodes received DTMF signals and sends the decoded result to the system controller 26; 16 is a siren speaker for performing notification of a state of emergency. 12 and 15 are respectively a speaker and a microphone, which function as a speaker phone permitting a reporting party to conduct a telephone call with an emergency report center.

Figure 11:
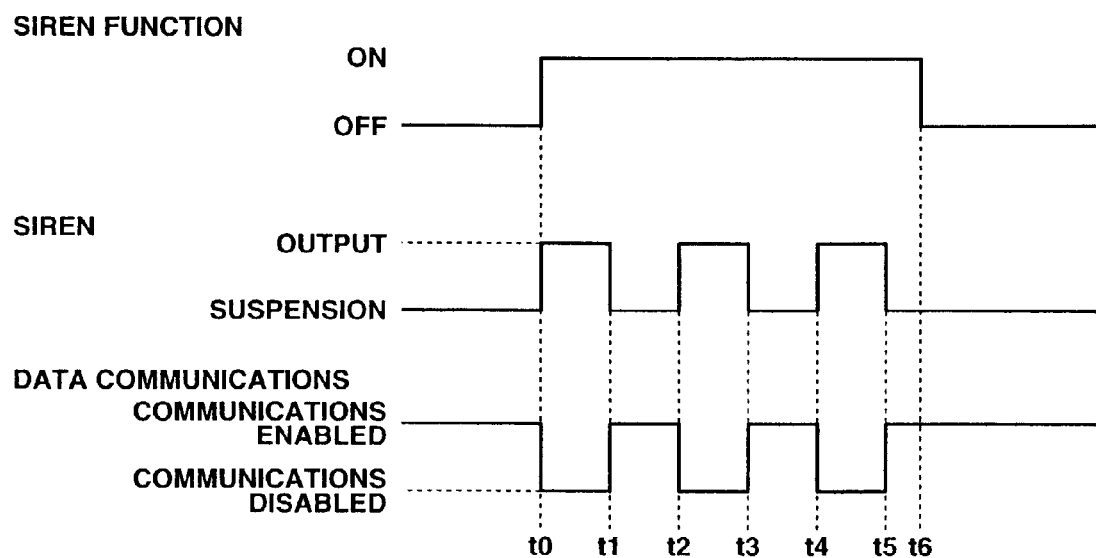
FIG. 11 is a timing chart of data communications of an emergency report cellular phone according to the present invention.
Figure 12:
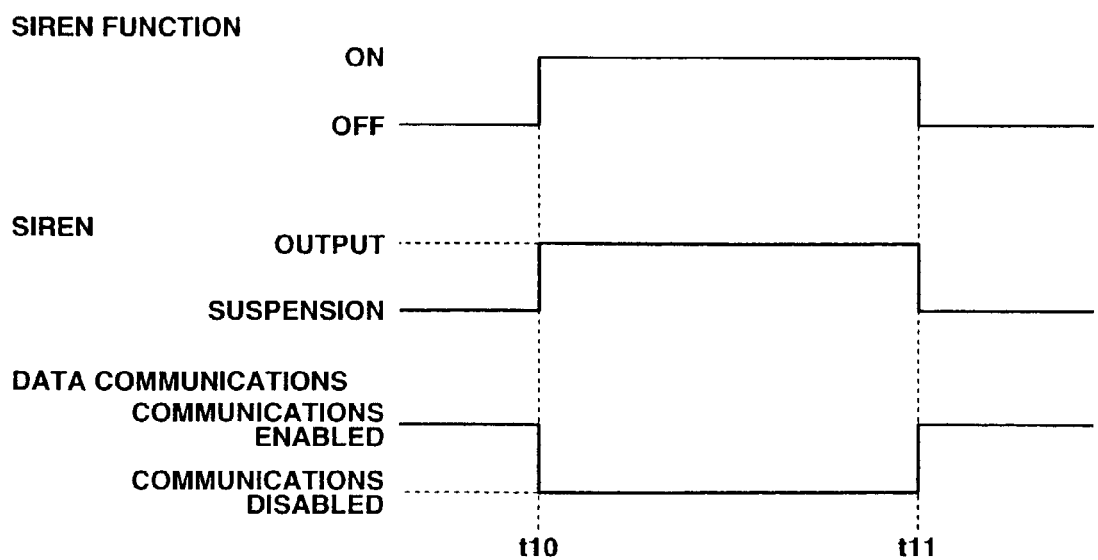
FIG. 12 is a timing chart of data communications by an emergency report cellular phone of the prior art.

FIG. 11 is a timing chart of data communications relating to the present embodiment; FIG. 12 is a timing chart of data communications according to the prior art. In this variety of device, as shown in FIG. 12, if, when data is being transmitted continually, the siren function is ON and output by the siren is continuous, while the siren function is ON, the reception of data is problematic in that there are frequent cases of reception data being destroyed. Since the siren speaker 16 consumes a great amount of electric power, when same is ON, the source voltage of the emergency report cellular phone 10 fluctuates greatly (this variety of power source is an ordinary battery and the internal impedance thereof is relatively high). As a result, the transmission frequency of the transmitter (VCO) fluctuates. Therefore, according to the present embodiment, as shown in FIG. 11, when the siren function is ON, the siren is driven intermittently, such that, even when the siren function is ON, data communications are performed when the siren is not being driven (while the siren output is suspended).

In FIG. 11, between time t0 and time t6, the siren function is ON. During this time, the siren speaker 16 is driven at predetermined intervals. At time t0 to time t1, time t2 to time t3, and time t4 to time t5, the siren speaker 16 is driven. On the other hand, at time t1 to time t2, time t3 to time t4, or time t5 to time t6, the siren speaker 16 is not driven. During periods when the siren speaker 16 is not driven, that is, at time t1 to time t2, time t3 to time t4, or time t5 to time t6, since the power source voltage is stable, data communications are possible. In the present embodiment, data communications are performed at these times.

In the present embodiment, processing to decode/sample data is always performed. As a result of the intermittent output of the siren, it is possible to effectively receive data (for example, DTMF data sent from an emergency report center, cellular control signals sent from a cellular system, and the like), at least during siren interruption (during siren suspension). Conventionally, in a state in which the siren is sounded without interruption, cellular control signals cannot be received and the line is therefore disconnected. However, according to the present embodiment, with data sampling always being performed, since it is possible to effectively receive data during interruption of the siren, the connection of the line can be maintained rather than the line being disconnected.

Figure 13:
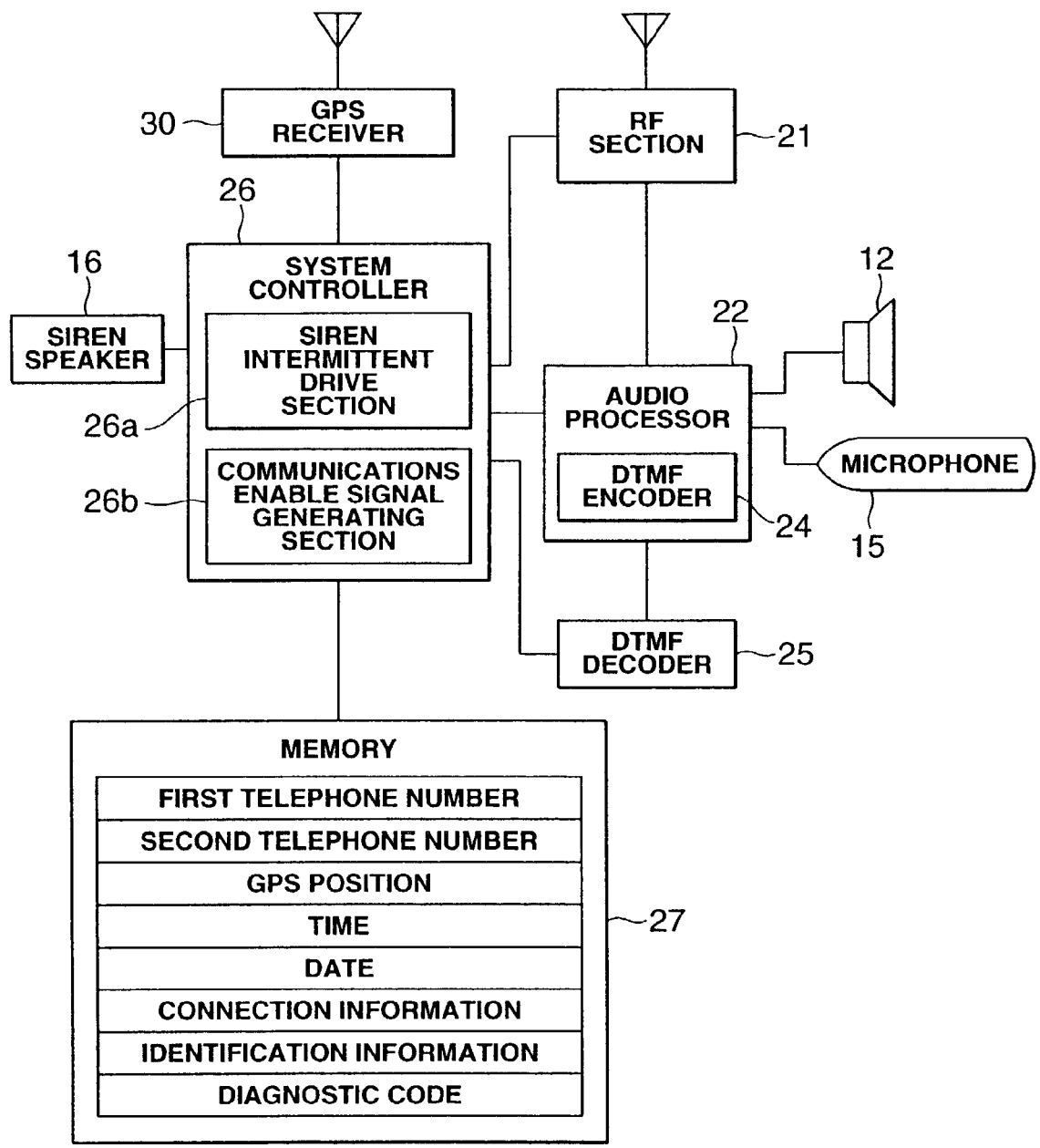
FIG. 13 is a block diagram of the functions of an emergency report cellular phone according to the present invention.
Figure 14:
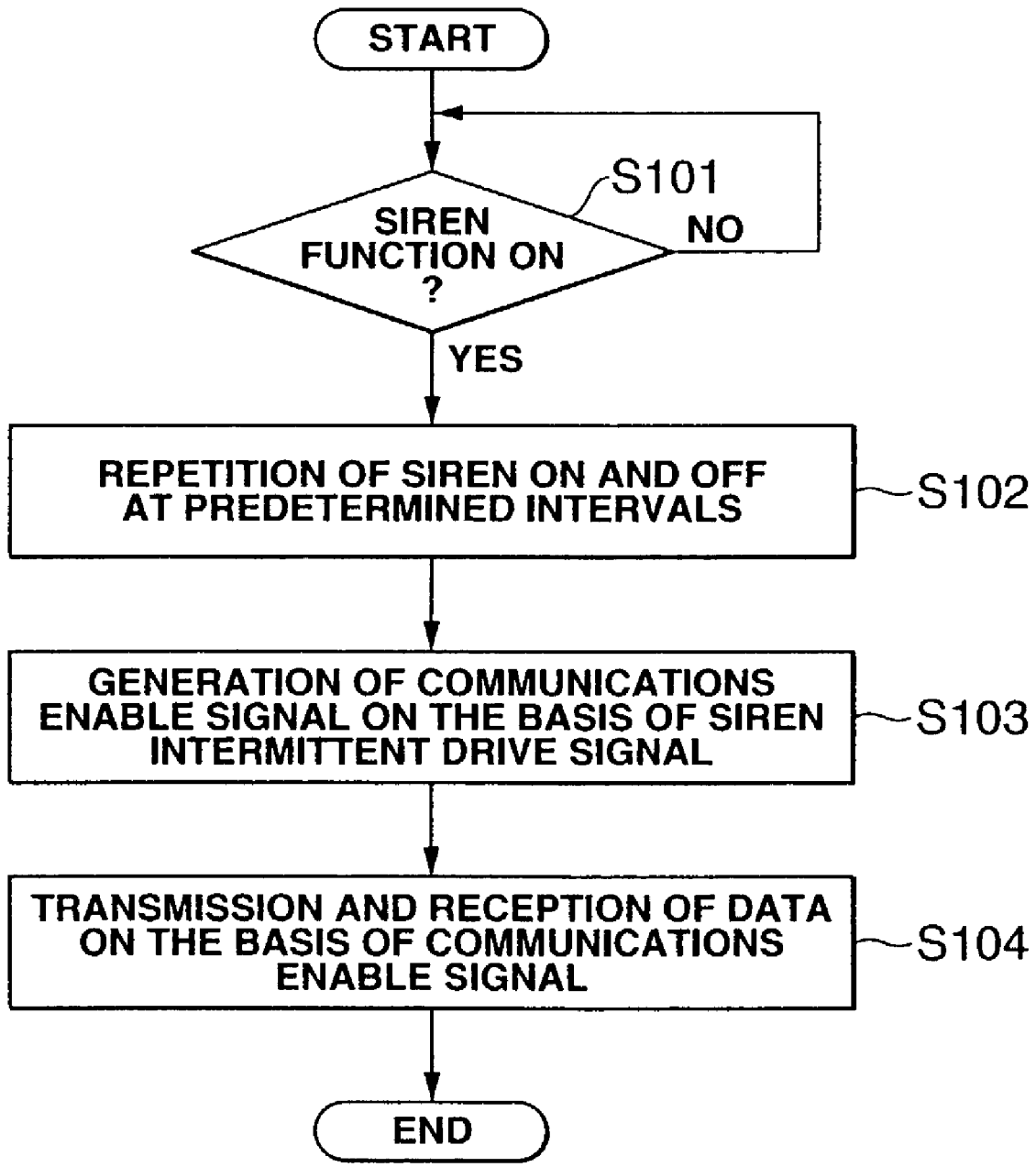
FIG. 14 is a flow chart to describe the procedure for data communications by an emergency report cellular phone according to the present invention.

FIG. 13 is another constitutional example in which a communications enable signal generating section 26b is provided in the system controller 26, the other constitutional elements being the same as those of FIG. 10. FIG. 14 is a flow chart to describe the procedure for data communications performed by an emergency report cellular phone. In the same figure, the emergency report cellular phone first judges whether or not the siren function is ON (S101), and when the siren function is ON (S101; YES), ON/OFF of the siren speaker 16 is repeated at predetermined intervals (S102). The timing for drive of the siren speaker 16 is the same as in FIG. 11. Thereafter, on the basis of the siren intermittent drive signal, a communications enable signal is generated. Normally, data communications are denied when the siren function is ON. However, by means of this communications enable signal, even when the siren function is ON, data communications are permitted at predetermined times. During periods when the siren speaker 16 is not driven, that is, at time t1 to time t2, time t3 to time t4, or time t5 to time t6, since the power source voltage is stable, data communications are possible. For example, the communications enable signal is a signal for which the logic of the siren drive signal is reversed. Next, on the basis of this communications enable signal, data is transmitted and received (S104).

There are also cases where the power source voltage does not return to a normal level immediately after the drive of the siren speaker 16 is suspended. Consequently, it is desirable that the rising edge of the communications enable signal should be delayed somewhat behind the sinking edge of the siren drive signal. This delay period is a period from the suspension of the siren speaker 16 until the power source voltage is restored. On the other hand, it is desirable that the sinking edge of the communications enable signal should be substantially synchronous with or somewhat earlier than the rising edge of the siren drive signal.

Third Embodiment

Figure 15:
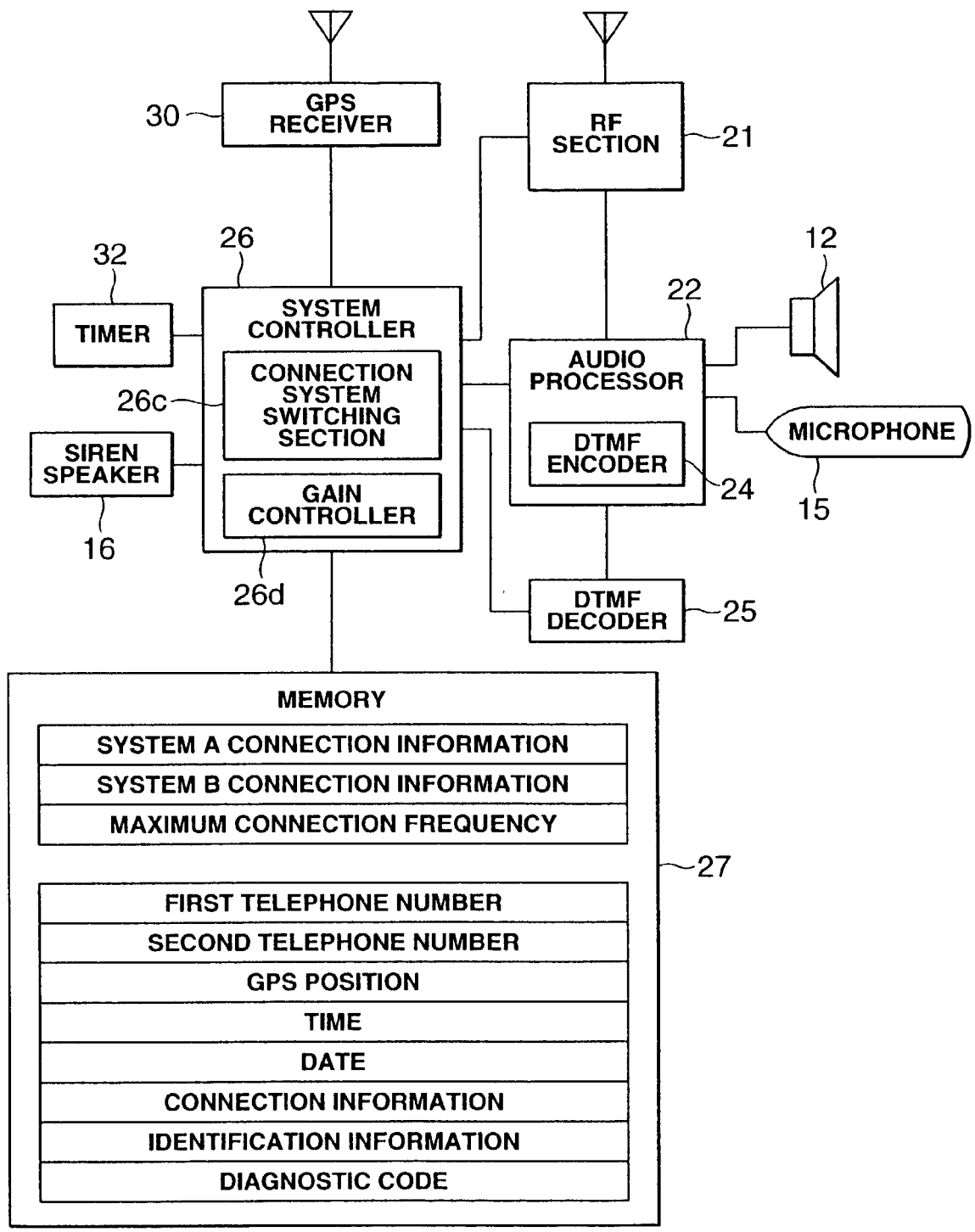
FIG. 15 is a block diagram of the functions of an emergency report cellular phone according to the present invention.

FIG. 15 is a block diagram of the functions of an emergency report cellular phone relating to the present embodiment. In the same figure, 30 is a GPS receiver for acquiring positional information, of the present device, and 26 is a system controller. The system controller 26 comprises a connection system switching section 26c for a connection with a plurality of cellular systems, and a gain controller 26d for adjusting the output level of the speaker 12 and the sensitivity of the microphone 15.

27 is a memory for storing information such as "System A connection information" for connecting to a cellular system A, "System B connection information" for connecting to a cellular system B, "Maximum connection frequency", which regulates the maximum value of the connection judgement frequency, a "first telephone number" and "second telephone number", which are contacts with respect to an emergency report center, "GPS position", "Time", "Date", "Connection information", "Identification information", "Diagnosis code", and the like; 21 is an RF section for a connection with a cellular system and for transmitting and receiving data and/or sound signals; 22 is an audio processor for voice communications with an emergency report center via a cellular system. The audio processor 22 comprises a DTMF encoder 24 for data communications.

25 is a DTMF decoder, which decodes received DTMF signals and sends the decoded result to the system controller 26; 16 is a siren speaker for performing notification of a state of emergency. 12 and 15 are respectively a speaker and a microphone, which function as a speaker phone permitting a reporting party to conduct a telephone call with an emergency report center. 32 is a timer (described hereinbelow) for judging time out for connection processing.

Figure 16:
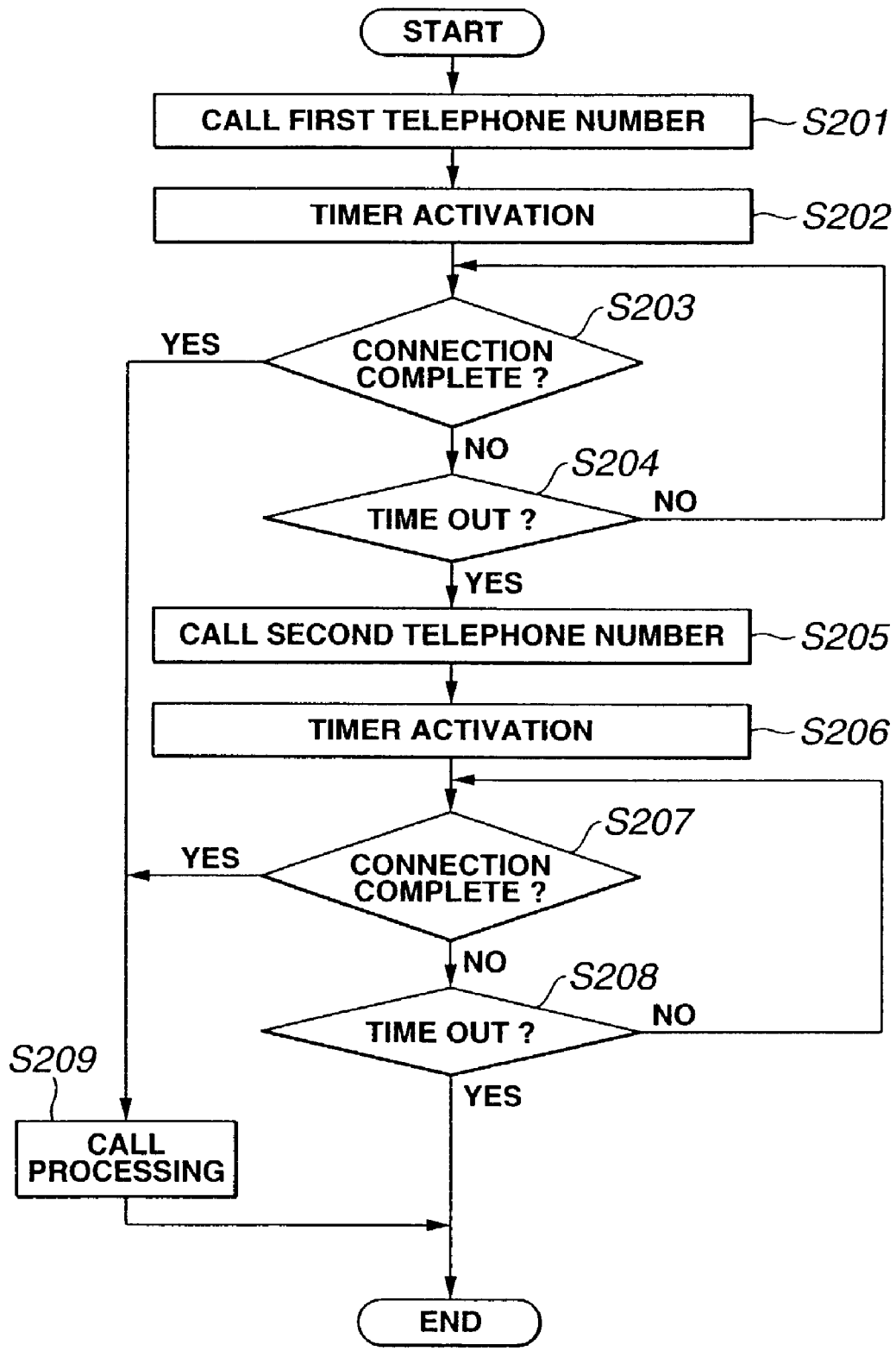
FIG. 16 is a flow chart describing connection processing with respect to an emergency report center.

FIG. 16 is a flow chart describing connection processing upon making a call with respect to an emergency report center when an emergency report is made. When an emergency report switch of the emergency report cellular phone is depressed, the emergency report cellular phone makes a request to call a contact (first telephone number) of an emergency report center which has been pre-recorded in the memory 27 (S201), then activates the timer 32 (S202), and judges whether or not a hello tone sent from the emergency report center is received (S203). When the emergency report cellular phone has received a hello tone, once the connection is complete (S203; YES), call processing is performed (S209). In a case where the hello tone is not received within a fixed period (S204; YES), the emergency report cellular phone makes a request to call another contact (second telephone number) of an emergency report center (S205). The emergency report cellular phone once again drives the timer 32 (S206), and then judges whether or not a hello tone sent from the emergency report center is received (S207). When the emergency report cellular phone has received a hello tone, once the connection is complete (S207; YES), call processing is performed (S209). In a case where the hello tone is not received within a fixed period (S208; YES), the emergency report cellular phone terminates connection processing with respect to the emergency report center.

It is thus possible to increase reliability of emergency reporting such that, even in a case where a connection with respect to a first telephone number is not possible, connection with respect to a second telephone is automatically attempted. Further, a constitution is also possible according to which, in a case where connection with respect to a first telephone number and a second telephone are not possible, the siren speaker 16 is driven to attract the attention of people in the surrounding area.

Figure 17:
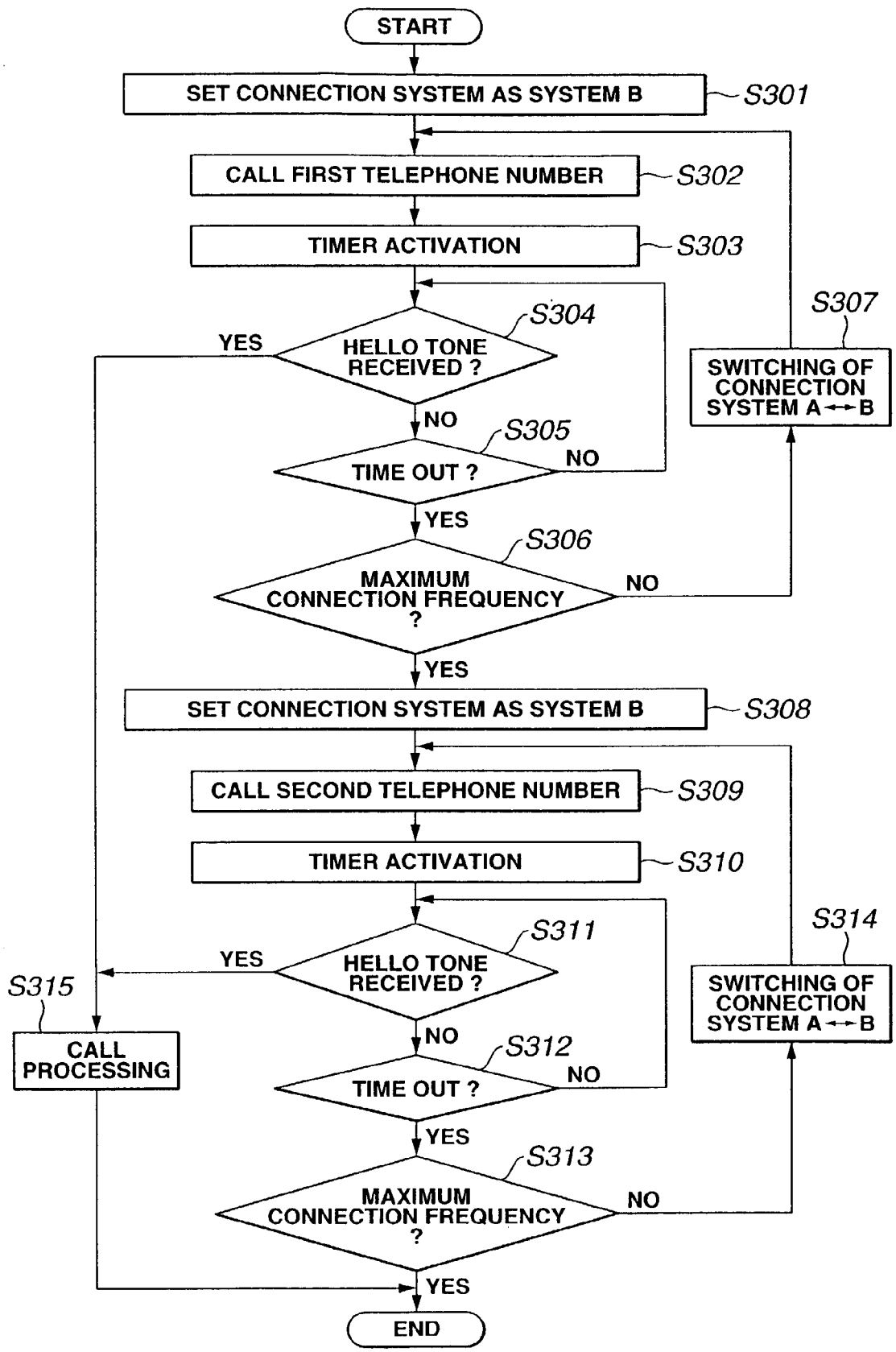
FIG. 17 is a flow chart describing connection processing with respect to an emergency report center.

FIG. 17 is a flow chart describing connection processing with respect to an emergency report center by means of a roaming connection. When an emergency report switch of the emergency report cellular phone is depressed, the emergency report cellular phone first sets a connection carrier network as system B (S301), and calls the above first telephone number (S302). Then the emergency report cellular phone activates the timer 32 (S303), and judges whether or not a hello tone sent from the emergency report center is received (S304). When the emergency report cellular phone has received a hello tone (S304; YES), call processing is performed (S315). In a case where the hello tone is not received within a fixed period (S305; YES), the emergency report cellular phone counts the connection frequency with respect to the first telephone number (the loop frequency of S302 to S307), and if the counted frequency is no more than a preset maximum connection frequency (S306; NO), the emergency report cellular phone switches the connection carrier network between system B and system A (S307), and once again calls the first telephone number (S302).

In a case where the connection frequency with respect to the first telephone number has exceeded a maximum value (S306; YES), the emergency report cellular phone sets a connection carrier network as system B (S308), and calls the second telephone number (S309). Then the emergency report cellular phone activates the timer 32 (S310), and judges whether or not a hello tone sent from the emergency report center has been received (S311). When the emergency report cellular phone has received a hello tone (S311; YES), call processing is performed (S315). In a case where the hello tone is not received within a fixed period (S312; YES), the emergency report cellular phone counts the connection frequency with respect to the second telephone number (the loop frequency of S309 to S314), and if the counted frequency is no more than the preset maximum connection frequency (S313; NO), the emergency report cellular phone switches the connection carrier network between system B and system A (S314), and once again calls the second telephone number (S309). In a case where the connection frequency with respect to the second telephone number has exceeded the maximum connection frequency (S313; YES), the emergency report cellular phone terminates connection processing with respect to the emergency report center.

It is therefore possible to ensure the reliability of emergency reporting by attempting a roaming connection with another carrier network in a case where a connection with a home system is not possible. Further, since a reporting party is not required to switch to another carrier network by means of a manual operation, such a system is effective in a case where a reporting party cannot perform such a manual operation, as well as in other cases.

Figure 18:
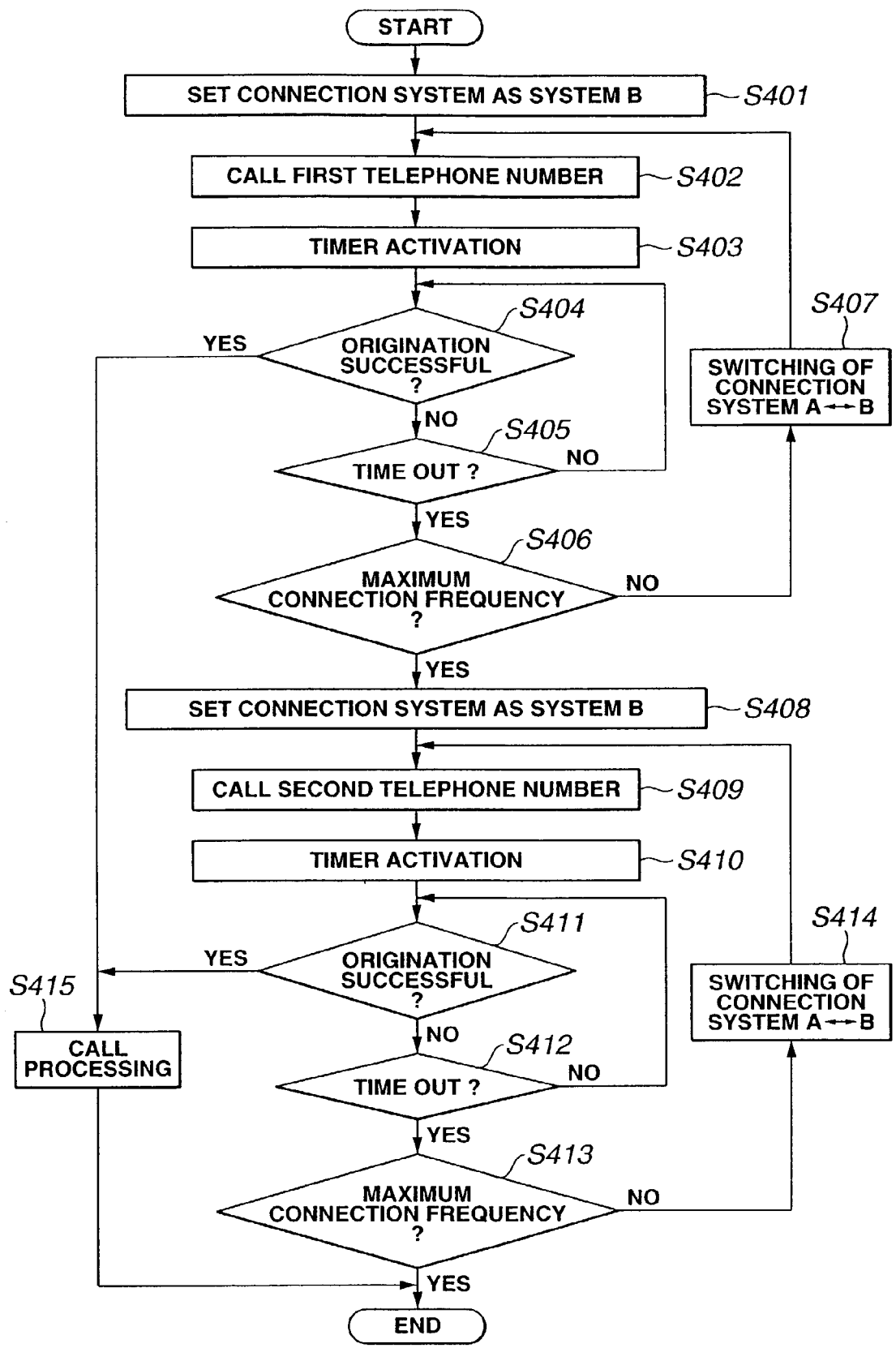
FIG. 18 is a flow chart describing connection processing with respect to an emergency report center.

Further, in the above description, a connection judgement, with regard to whether a hello tone is received, was performed S304, S311). However, instead, a connection judgement, with regard to whether origination is successful, may be performed, as shown in FIG. 18 (S404, S411).

Figure 19:
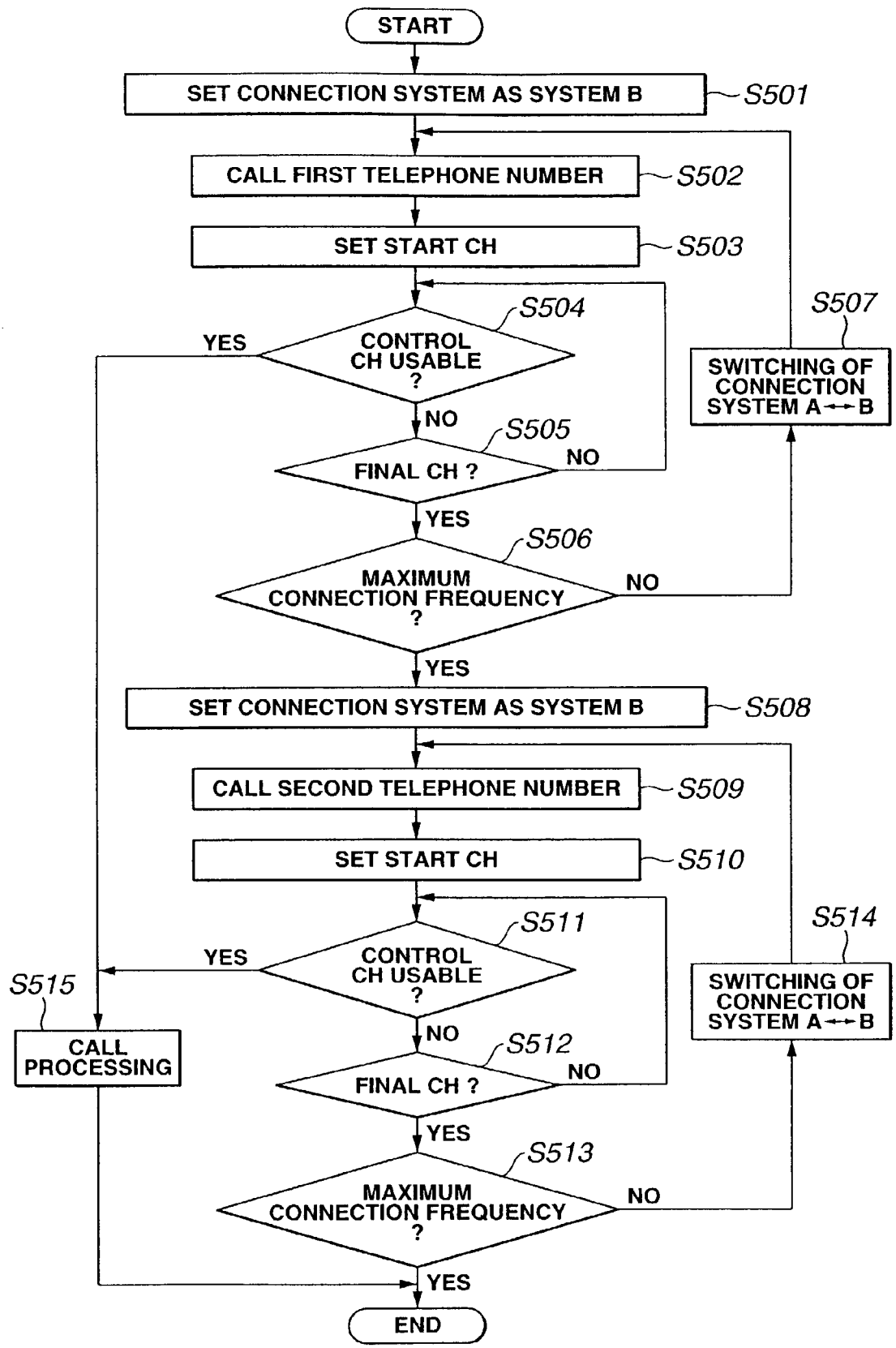
FIG. 19 is a flow chart describing connection processing with respect to an emergency report center.

FIG. 19 is a modified example of the processing procedure shown in FIG. 17. In the example shown in FIG. 19, a control channel is utilized to make a connection judgement with respect to systems. In the same figure, when an emergency report switch of the emergency report cellular phone is depressed, the emergency report cellular phone first sets a connection carrier network as system B (S501), and calls the above first telephone number (S502). In an AMPS, a system A control channel is allotted CH1 to CH333 (870.030 MHz to 879.990 MHz), and a system B control channel is allotted CH334 to CH666 (880.020 MHz to 889.980 MHz). Therefore, when a search is to be conducted of the control channels which can be used by system B, the emergency report cellular phone sets a control channel (hereinbelow termed start CH) to start the search (S503). Next, the emergency report cellular phone searches the control channels which can be used (S504 to S505) and, upon detecting a control channel which can be used (S504; YES), performs communication processing (S515). When the search of all the control channels of system B has ended (S505; YES), the emergency report cellular phone counts the connection frequency with respect to a first telephone number (the loop frequency of S502 to S507), and if the counted frequency is no more than a preset maximum connection frequency (S506; NO), the emergency report cellular phone switches the connection carrier network between system B and system A (S507), and once again calls the first telephone number (S502).

In a case where the connection frequency with respect to the first telephone number has exceeded a maximum value (S506; YES), the emergency report cellular phone sets a connection carrier network as system B (S508), and calls the second telephone number (S509). The emergency report cellular phone sets a start CH in the same manner described above (S510), and searches the control channels which can be used (S511 to S512). Upon detecting a control channel which can be used (S511; YES), the emergency report cellular phone performs communication processing (S515). When the search of all the control channels of system B has ended (S512; YES), the emergency report cellular phone counts the connection frequency with respect to the second telephone number (the loop frequency of S509 to S514), and if the counted frequency is no more than the preset maximum connection frequency (S513; NO), the emergency report cellular phone switches the connection carrier network between system B and system A (S514), and once again calls the second telephone number (S509). In a case where the connection frequency with respect to the second telephone number has exceeded the maximum value (S513; YES), the emergency report cellular phone terminates the connection with respect to the emergency report center.

Figure 20:
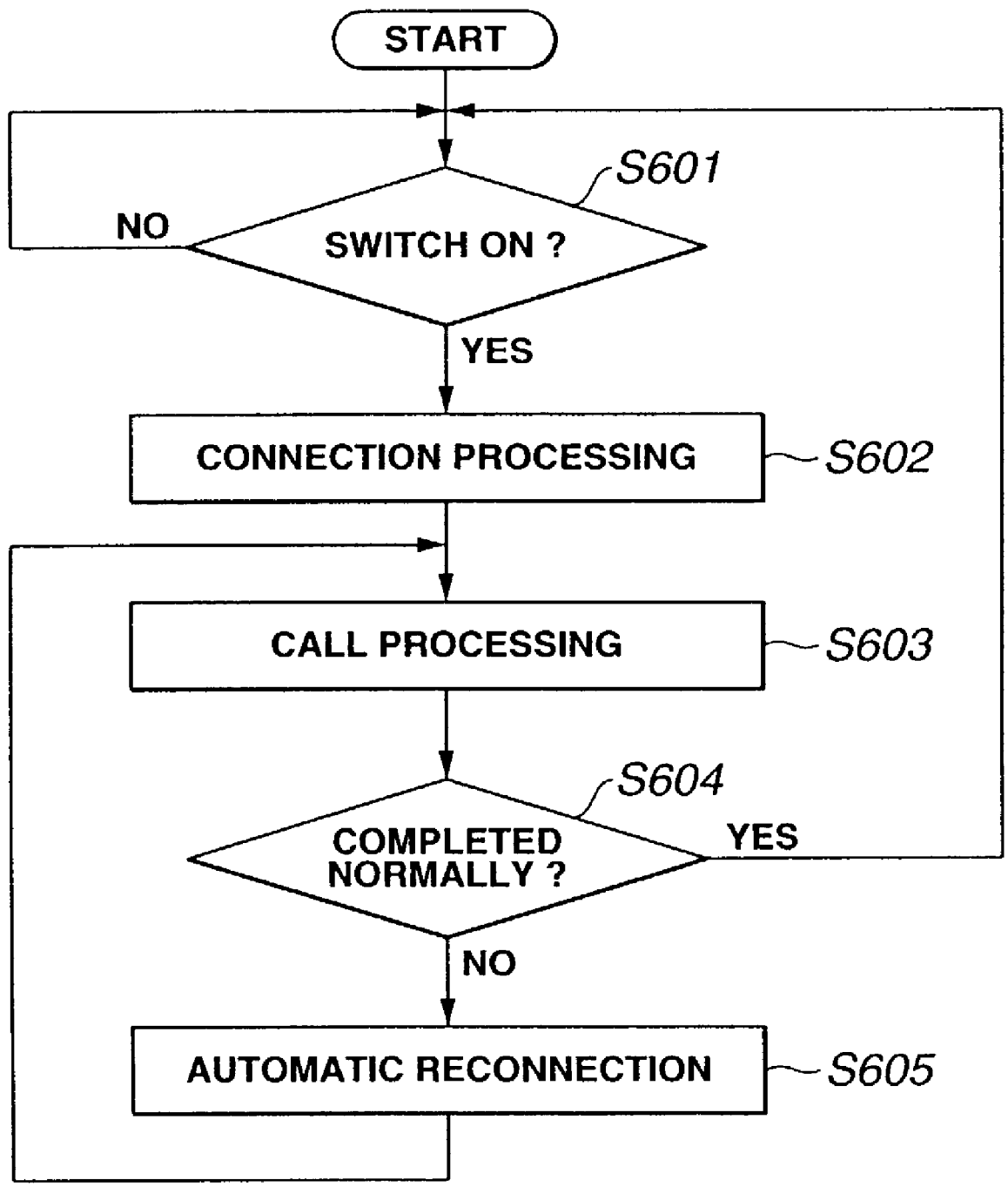
FIG. 20 is a flow chart describing connection processing with respect to an emergency report center.

The description provided above is related to connection processing with respect to an emergency report center when an emergency report is made. However, in the event of a communications error arising in the course of a telephone call with an emergency report center, automatic reconnection is attempted according to the processing procedure shown in FIG. 20. In this same figure, if the emergency report switch is depressed (S601; YES), the emergency report cellular phone performs connection processing with respect to the emergency report center (S602) and call processing is performed (S603). Here, if a telephone call ends normally (S604; YES), the processing returns to S601. However, in a case where a telephone call does not end normally as a result of a communications error (S604; NO), the emergency report cellular phone performs automatic reconnection processing with respect to an emergency report center (S605).

Therefore, in a case where a telephone call ends anomalously as a result of a communications error in an emergency, since reconnection is attempted automatically, the reporting party is relieved of the task of performing reconnection himself or herself by means of a manual operation and is afforded a sense of security on account of reliable reconnection being possible. Particularly as there are also cases where, in an emergency, it is difficult for a reporting party to perform a manual operation, by ensuring that automatic reconnection is effected, it is possible to improve the reliability of emergency reporting.

Figure 21:
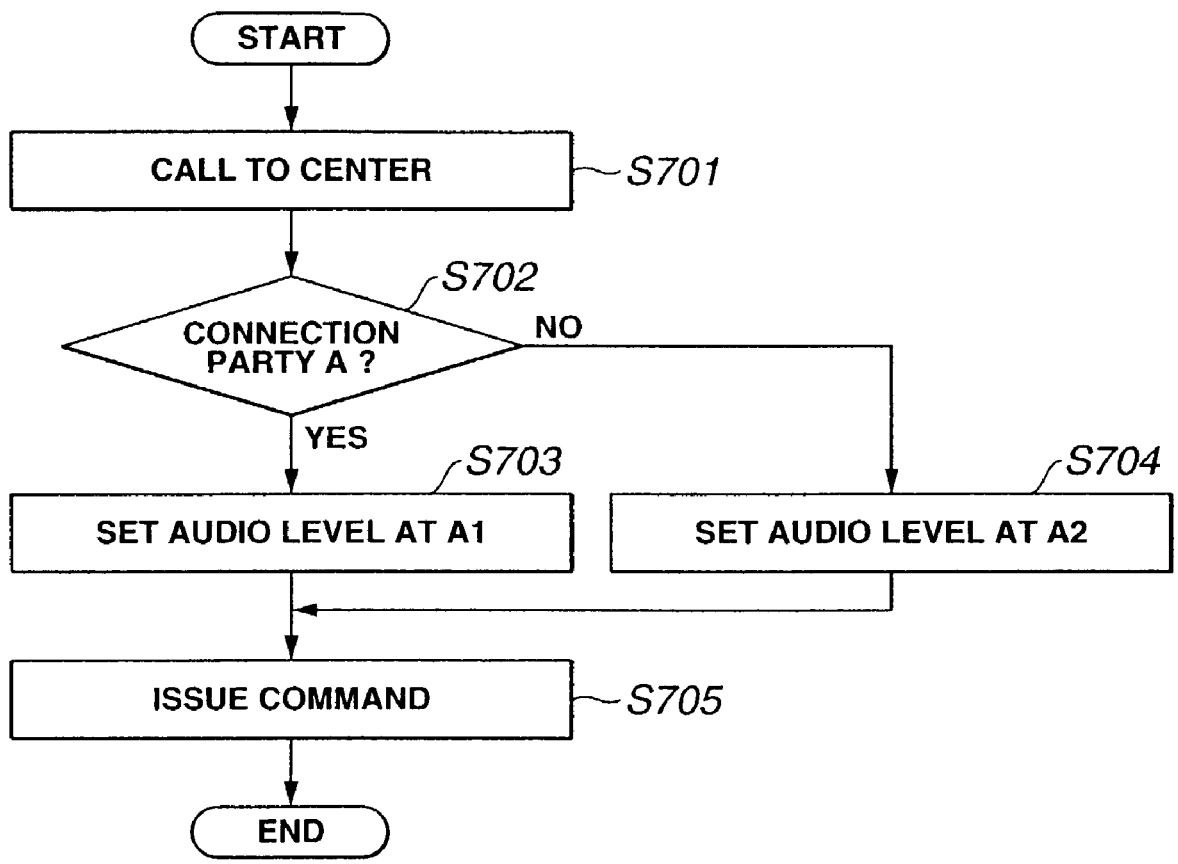
FIG. 21 is a flow chart describing a procedure for setting audio levels.

FIG. 21 is a flow chart to describe a processing procedure for varying the audio output levels of a speaker 12 in accordance with a connection party. In the same figure, when the emergency report switch is depressed, the system controller 26 makes a request to call an emergency report center (S701). When a connection is made to system A (S702; YES), the system controller 26 sets the audio level at A1 (S703) and issues an audio level setting command to the gain controller 26d (S705). On the other hand, when a connection is made to system B (S704), the system controller 26 sets the audio level at A2 (S704) and issues an audio level setting command to the gain controller 26d (S705). In accordance with the commands requested from the system controller 26, the gain controller 26d adjusts the amplification gain of sound signals to adjust the audio output level of the speaker 12.

Therefore, by presetting the audio level for each connection party and thus varying the audio level in accordance with a connection party, it is possible to implement a stable audio level output. However, although the description provided above is related to the audio output level of a speaker 12, it is equally possible to adjust the sensitivity of the microphone 15 to an optimum value in accordance with a connection party.

Figure 22:
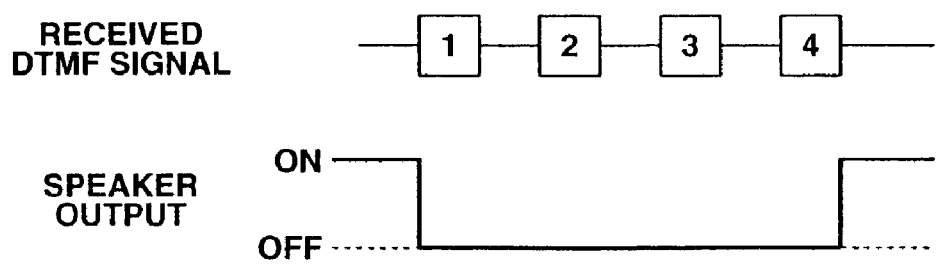
FIG. 22 is an illustrative view of the ON/OFF of a speaker output.

Further, in a case where DTMF signals are sent from the emergency report center, when DTMF signals and voice signals of a caller are outputted to the speaker 12 without a distinction being made between these signals, since there is a difference in volume between DTMF signals and voice signals, this is hard on the ears of the reporting party. For this reason, as shown in FIG. 22, when the audio processor 22 receives DTMF signals, the audio output of the speaker 12 is turned OFF.

Therefore, according to the present embodiment, even in a case where the emergency report cellular phone cannot form a connection with respect to a first telephone number, since a connection with respect to a second telephone number is attempted automatically, the safety of the reporting party can be ensured.

Further, according to the present embodiment, even in a case where a connection with respect to an emergency report center is not possible via a first carrier network, since a connection with respect to the emergency report center via a second carrier network is made by means of a roaming connection, the safety of the reporting party can be ensured.

Additionally, according to the present embodiment, in a case where the emergency report cellular phone receives DTMF signals from an emergency report center, since the audio output of the speaker is turned OFF, it is possible to suppress an excessive output volume as a result of the difference between DTMF signals and voice signals, and a smooth telephone call between a reporting party and the emergency report center is thus made possible.

Also, according to the present embodiment, due to the fact that the audio output level of a speaker and/or microphone sensitivity can be set at an optimum value according to the connection party, a smooth telephone call between a reporting party and the emergency report center is made possible.

Furthermore, according to the present embodiment, even in a case where the line is disconnected as a result of a communications error in the course of a telephone call with an emergency report center, because the emergency report cellular phone automatically reconnects to the emergency report center, the safety of a reporting party can be ensured.

Fourth Embodiment

Figure 23:
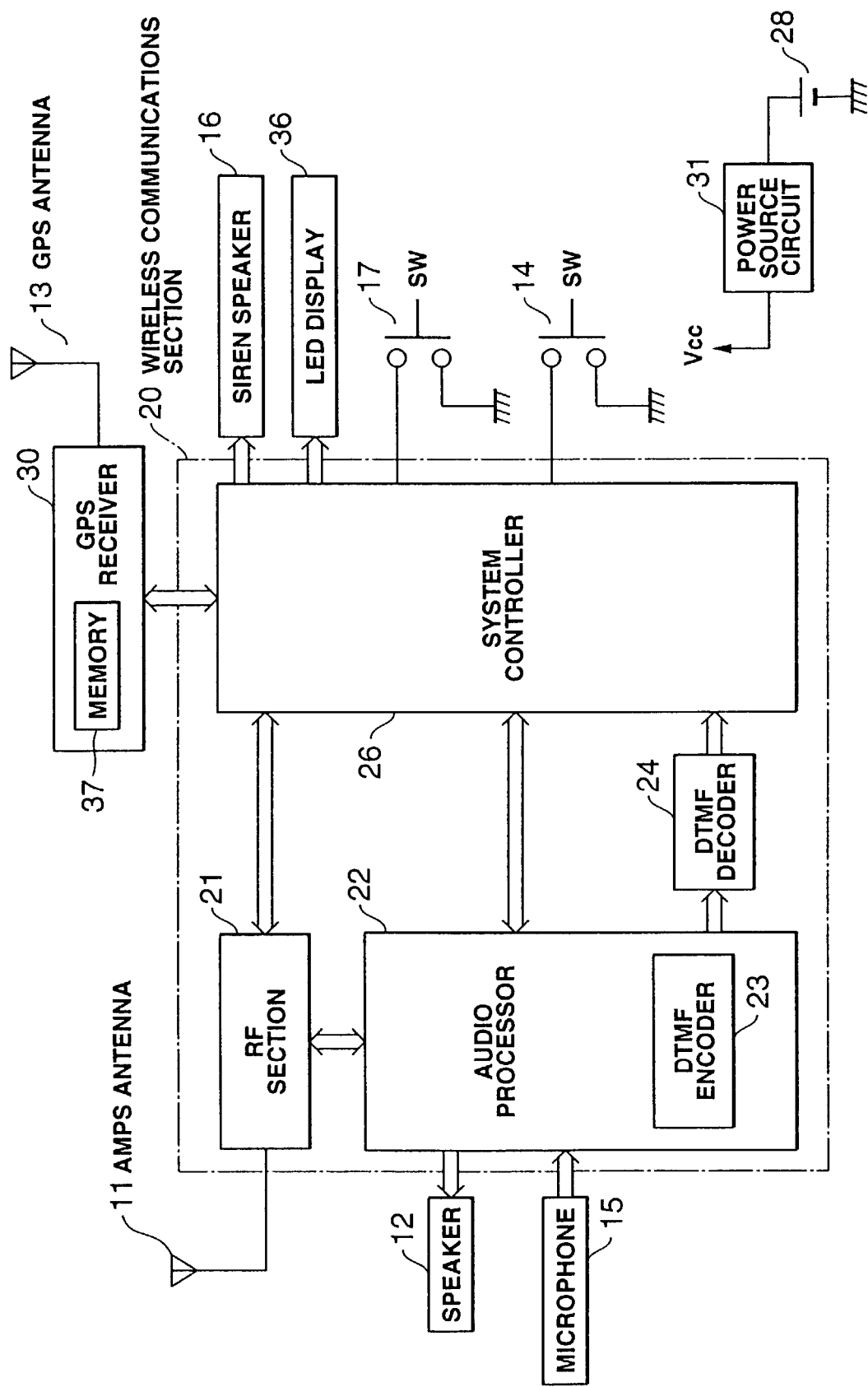
FIG. 23 is a block diagram of the functions of an emergency report cellular phone.

FIG. 23 is a block diagram of the functions of an emergency report cellular phone 10 relating to the present embodiment. A module with the same reference symbol as in FIG. 3 implements the same functions, and therefore a detailed description thereof will be omitted here.

The emergency report cellular phone 10 is principally constituted from a wireless communications section 20 and a GPS receiver 30. The system controller 26 receives NMEA (National Marine Electronics Association)-0183 data which is outputted from the GPS receiver 30 and longitudinal and latitudinal information contained in this NMEA-0183 data is converted into DTMF signals by a DTMF encoder 23 and transmitted to the emergency report center via an analog line.

Further, components connected with the system controller 26 are a siren speaker 16 for attracting the attention of people in the vicinity of a user, an emergency report switch 14, a self-diagnosis switch 17, and an LED display 35. The LED display 35 is a display device that serves to light up the LEDs 32 to 34. LED 32 is constituted to switch ON and OFF when an emergency report is made. LEDs 33 and 34 are constituted to switch ON and OFF in accordance with self-diagnosis results described hereinbelow.

The GPS receiver 30 captures three GPS satellites of the total of twenty-four GPS satellites that circumnavigate the globe, and receives GPS signals, including spectrum diffused and modulated ephemeris data and almanac data, which are sent from these satellites to thus calculate pseudo ranges from the satellites to the positioning point. Further, by receiving GPS signals from four satellites, the GPS receiver 30 also corrects errors in pseudo ranges to calculate degrees longitude and latitude of the positioning point. The positioning information computed by the GPS receiver 30 is outputted to the system controller 26 as NMEA-0183 data. The GPS receiver 30 comprises a memory 37 that stores satellite positional information for when GPS positioning was performed on a previous occasion, and satellite positional information for the country where the emergency report cellular phone was sold. The GPS receiver 30 captures satellites on the basis of this longitudinal and latitudinal information, and requests longitudinal and latitudinal information at a positioning point by receiving GPS signals.

Figure 24:
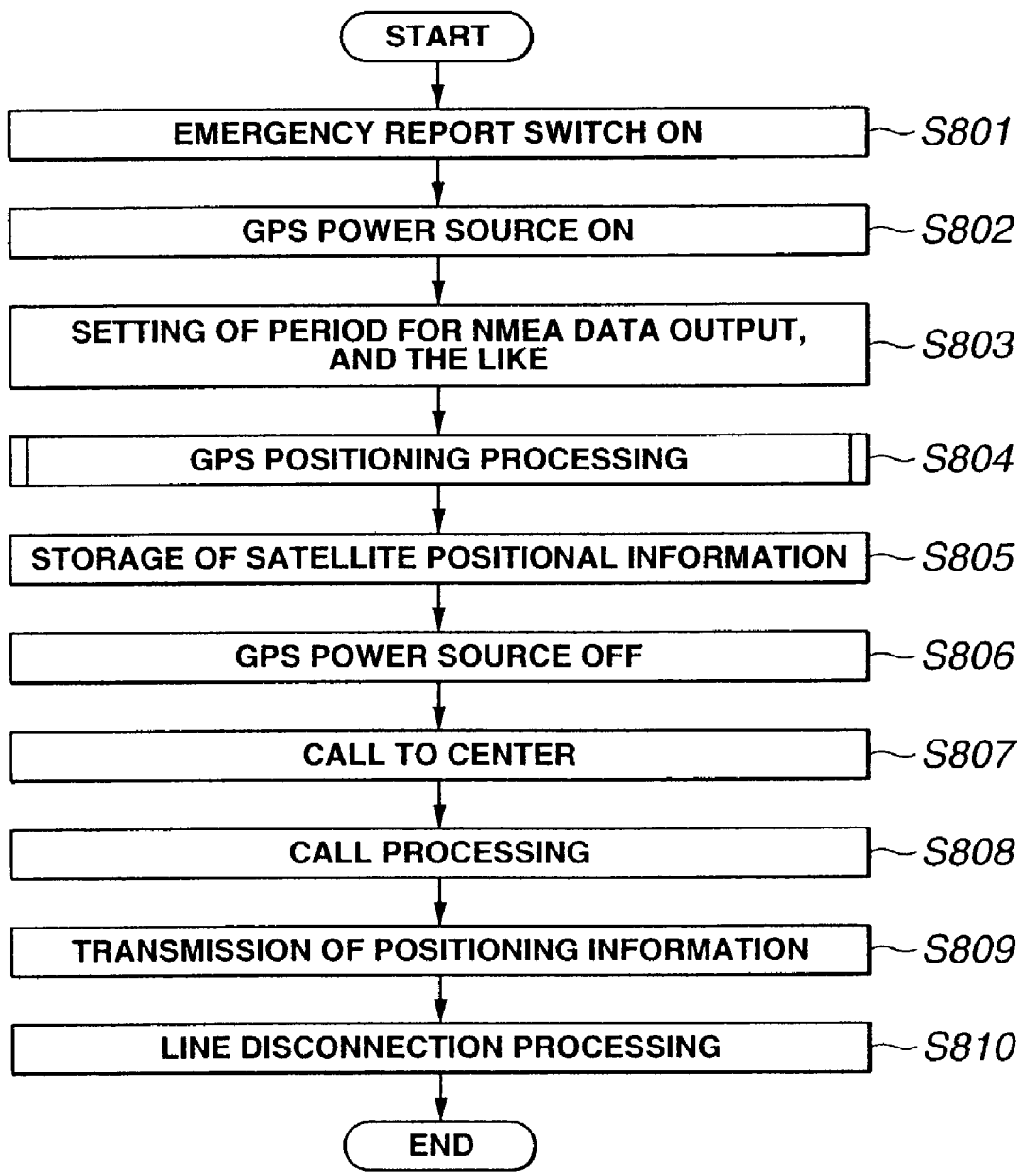
FIG. 24 is a flow chart describing a procedure by which an emergency report cellular phone transmits positioning information to an emergency report center.

Next, referring to FIG. 24, a description will be provided of the procedure according to which the emergency report cellular phone 10 performs emergency reporting and transmits positioning information to an emergency report center. If the emergency report switch 14 is depressed (S801), the emergency report cellular phone 10 turns ON the power source of the GPS receiver 30 (S802) to thus perform initialization of the GPS receiver 30. Thereafter, the emergency report cellular phone 10 sets the NMEA-0183 data which is outputted from the GPS receiver 30 to the system controller 26 and the output period of this data (S803). Here, with regard to the content of the data to be set, for example, in a case where it is only desired to learn of the positioning state, longitudinal and latitudinal information and the number of satellites, only "GPGGA (Global Positioning System Fix Data)" is employed and commands are used in accordance with the information to be obtained. Further, the output period of the NMEA-0183 data is desirably set as the shortest output period. As a result, when, for example, the GPGGA is outputted at one second intervals, setting is possible such that the output of all data other than this data is denied, for instance. Therefore, by setting the NMEA-0183 data outputted from the GPS receiver 30 to the system controller 26 and the output period for this data to be in the minimum range required to perform GPS positioning in a short time and according to a required minimum, it becomes possible to suppress the load on the system controller 26 that monitors the data outputted from the GPS receiver 30 and to suppress memory usage.

Figure 25:
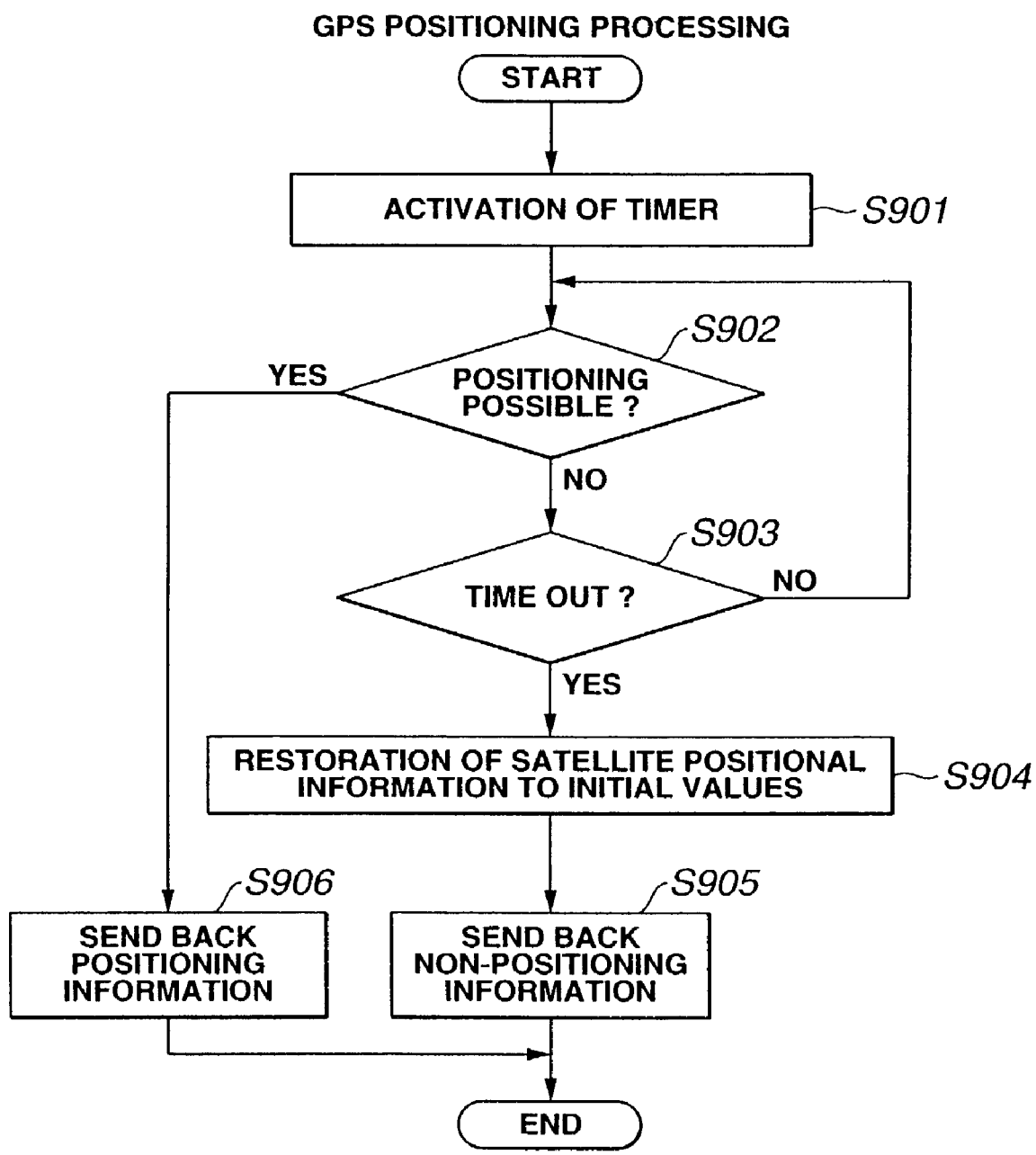
FIG. 25 is a flow chart describing a procedure for GPS positioning processing.

Thereafter, the GPS receiver 30 performs GPS positioning processing (S804). The GPS positioning processing in S804 will be described by referring to FIG. 25. As shown in the same figure, the GPS receiver 30 first drives a timer (S901), captures satellites on the basis of the satellite positional information stored in the memory 37 and calculates degrees longitude and latitude for a positioning point from GPS signals such as almanac data which are received from the satellites thus captured. In addition, in a case where GPS positioning can be performed within a fixed period (S902; YES), positioning information is sent back (S906), but, in a case where the fixed period has elapsed without GPS positioning having been possible (S903; YES), when it is judged that the location where GPS positioning is performed and the location where same was performed previously are notably far apart, the satellite positional information stored in the memory 37 is restored to initial values (S904), and non-positioning information is sent back (S905). The initial value is suitably the satellite positional information for the country where the emergency report cellular phone was sold, for example. Therefore, when GPS positioning is performed the next time, since satellite capture is performed using the satellite positional information for the country where the emergency report cellular phone was sold, a reduction of the GPS positioning time can be expected.

Here, returning to FIG. 24, in a case where GPS positioning has been possible, the emergency report cellular phone stores the satellite positional information in the memory 37 (S805), and turns OFF the power source of the GPS receiver 30 (S806). Next, the emergency report cellular phone calls an emergency report center (S807), and, upon confirming that a response message (hello tone) in the form of a DTMF signal has been received from the emergency report center, forms a call link and performs call processing (S808). By means of this call processing, the emergency report center is able to ascertain the physical condition of a reporting party. Following completion of the call processing, the emergency report cellular phone 10 converts positioning information into a DTMF signal, sends this signal to the emergency report center via an analog line (S809), and then disconnects the line (S810). As a result, by limiting the period required for the GPS positioning processing (S804) to a fixed period, since it can definitely be ensured that connection with the emergency report center is within a fixed period, irrespective of the success or failure of the GPS positioning, it is possible to improve reliability in an emergency.

Further, in the above description, satellite positioning information obtained by GPS positioning performed in order to transmit positioning information to the emergency report center is stored in the memory 37. However, a constitution is also possible according to which a GPS positioning special mode is set in which only GPS positioning (S804) is performed without an emergency report being made, and the satellite positional information obtained in the GPS positioning special mode is stored in the memory 37. Therefore, by setting the GPS positioning special mode, even in a case where there is a great disparity between the current geographical point of a reporting party and the previous GPS positioning point, since satellite positional information which is close to the current position of the reporting party is pre-stored in the memory 37, the GPS positioning time when an emergency report is made can be shortened.

Figure 26:
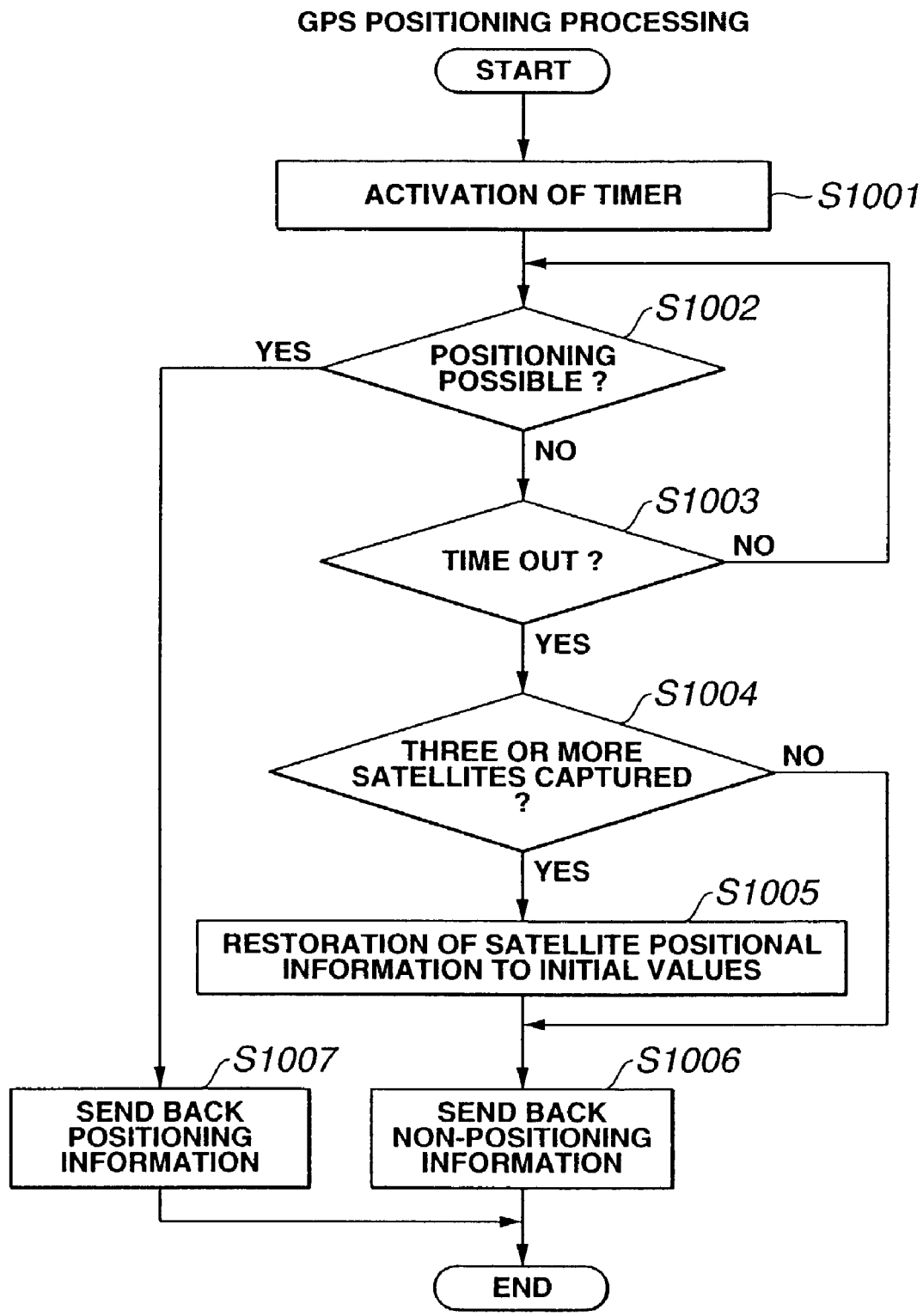
FIG. 26 is a flow chart describing a procedure for GPS positioning processing.

Next, another example of GPS positioning processing (S804) will be described by referring to FIGS. 26 through 28. As shown in FIG. 26, the GPS receiver 30 first drives a timer (S1001), captures satellites by referencing satellite positional information stored in the memory 37 and calculates degrees longitude and latitude for a positioning point from GPS signals such as almanac data which are received from the satellites thus captured. In addition, in a case where GPS positioning has been possible within a fixed period (S1002; YES), positioning information is sent back (S1007), but, in a case where the fixed period has elapsed without GPS positioning having been possible (S1003; YES), it is judged whether or not three or more satellites have been captured (S1004). When three or more satellites have been captured (S1004; YES), irrespective of whether positioning is performed in an environment permitting GPS positioning (for example, outdoors), it can be judged that positioning has not been possible. It may be assumed that the cause of positioning not being possible is attributable to a great disparity between the previous positioning point and the present positioning point. Therefore, the satellite positional information stored in the memory 37 is restored to initial values (for example, positional information for the country where the emergency report cellular phone was sold) (S1005), and non-positioning information is sent back (S1006). On the other hand, in a case where three or more satellites have not been captured (S1004; NO), non-positioning information is sent back (S1006).

Figure 27:
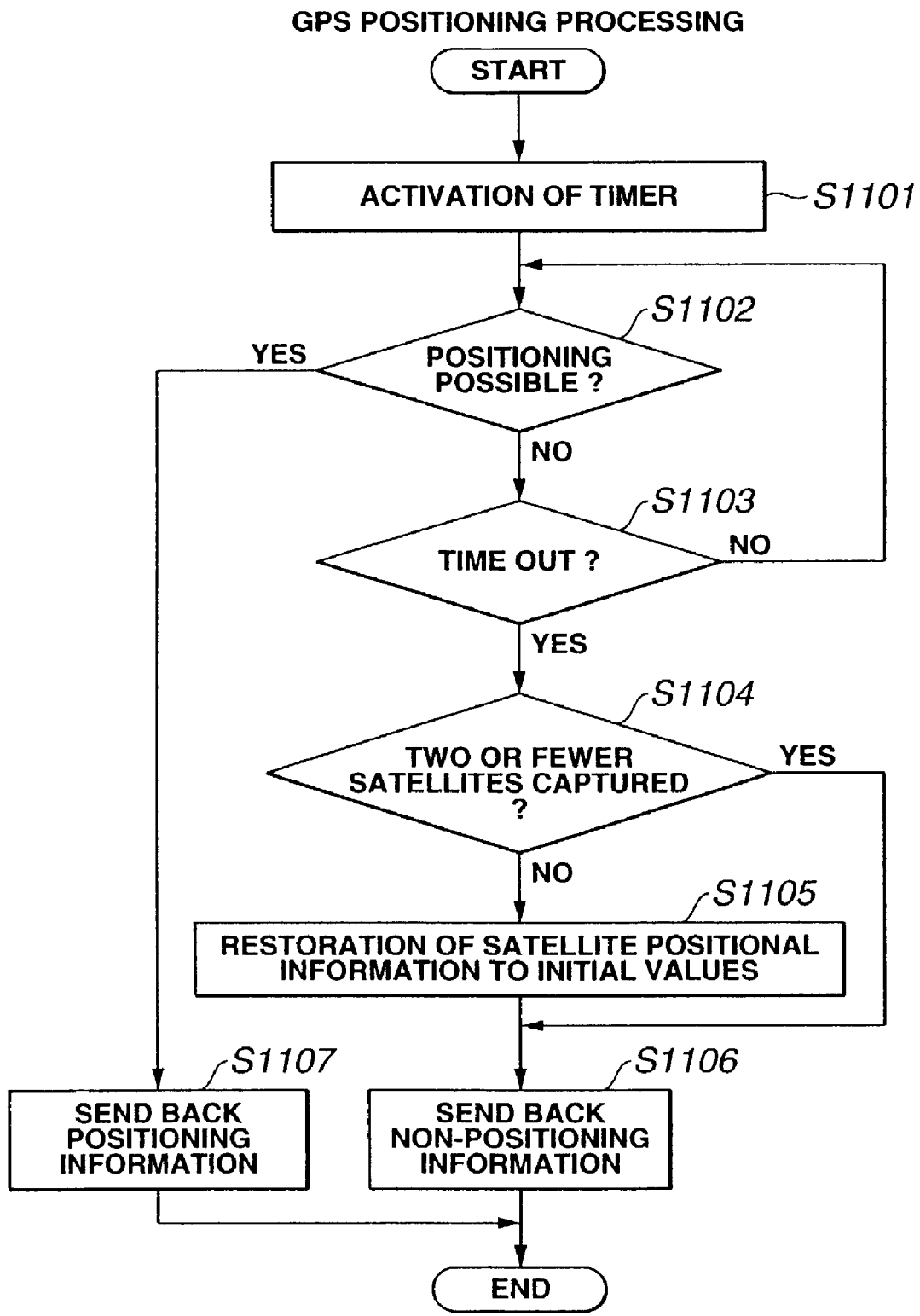
FIG. 27 is a flow chart describing a procedure for GPS positioning processing.

The processing procedure of FIG. 27 is a modified example of the processing procedure of FIG. 26. In FIG. 27, the GPS receiver 30 first drives a timer (S1101), captures satellites by referencing satellite positional information stored in the memory 37 and calculates degrees longitude and latitude for a positioning point from GPS signals such as almanac data which are received from the satellites thus captured. In addition, in a case where GPS positioning has been possible within a fixed period (S1102; YES), positioning information is sent back (S1107), but, in a case where the fixed period has elapsed without GPS positioning having been possible (S1103; YES), it is judged whether or not two or fewer satellites have been captured (S1104). When the number of satellites which have been captured is two or less (S1104; YES), it can be judged that positioning is being performed in an environment not permitting GPS positioning (for example, indoors). Therefore, in such a case, non-positioning information is sent back (S1106). On the other hand, in a case where three or more satellites have been captured (S1104; NO), satellite positional information is restored to initial values (for example positional information for the country where the emergency report cellular phone was sold) (S1105), and non-positioning information is sent back (S1106).

Therefore, in a case where GPS positioning is not possible within a fixed period, by checking the number of satellites captured, it is possible to judge that GPS positioning was not possible as a result of positioning being performed in an environment not permitting GPS positioning, for example indoors, or as a result of a great disparity between the previous positioning point and the present positioning point. When the cause of GPS positioning not being possible lies with the latter disparity, the satellite positional information is restored to initial values (for example, positional information for the country where the emergency report cellular phone was sold), and a reduction of the next GPS positioning time can be expected.

Figure 28:
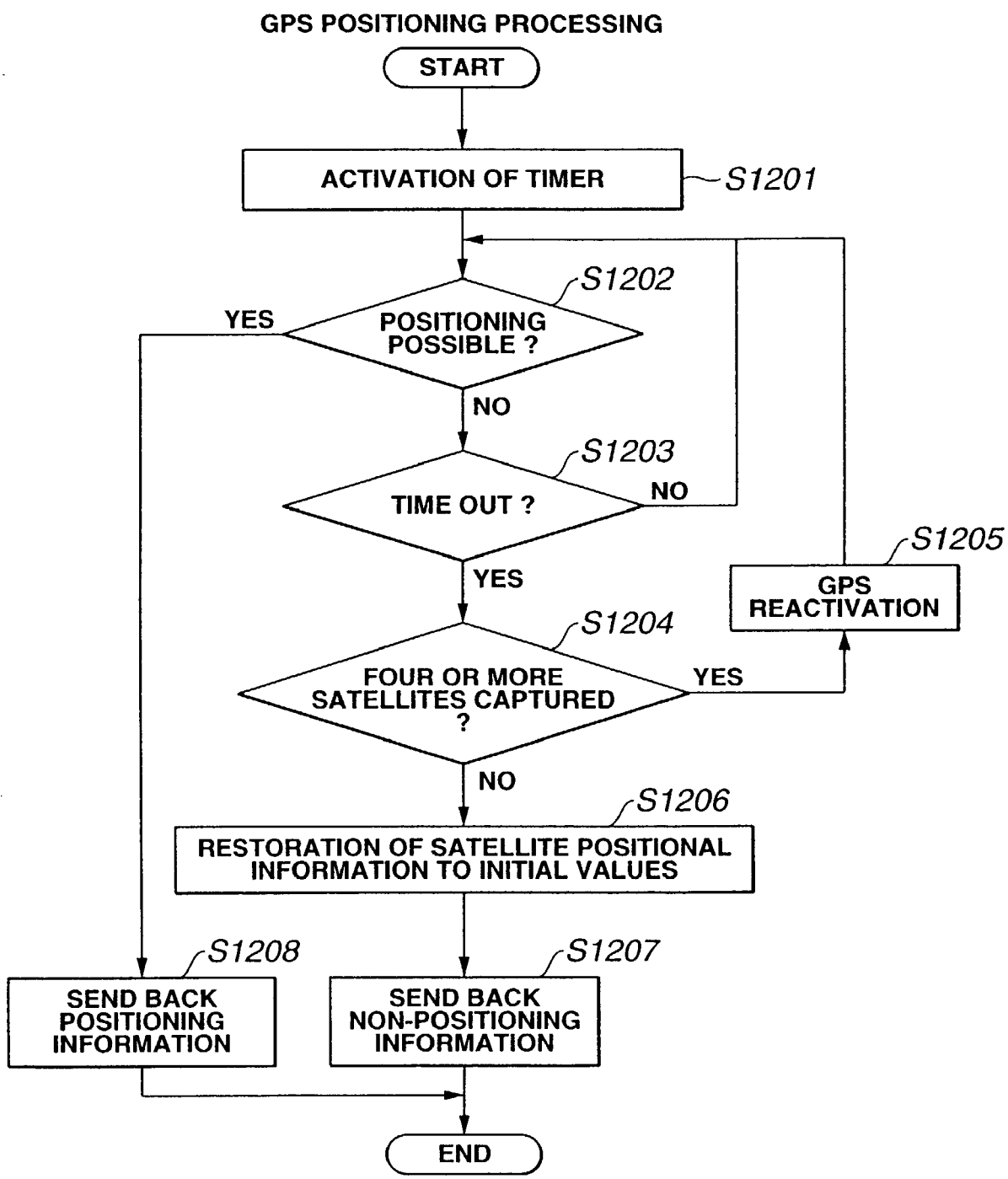
FIG. 28 is a flow chart describing a procedure for GPS positioning processing.

Finally, a description with regard to the GPS positioning processing in FIG. 28 will be provided. In the same figure, the GPS receiver 30 first drives a timer (S1201), captures satellites by referencing satellite positional information stored in the memory 37 and calculates degrees longitude and latitude for a positioning point from GPS signals such as almanac data which are received from the satellites thus captured. In addition, in a case where GPS positioning has been possible within a fixed period (S1202; YES), positioning information is sent back (S1208), but, in a case where the fixed period has elapsed without GPS positioning having been possible (S1203; YES), the system controller 26 monitors the positioning completion status, which is contained in GGA data outputted at fixed intervals from the GPS receiver 30, and the number of satellites captured (S1204).

When four or more satellites required for three-dimensional positioning have been captured and the positioning completion status registers "positioning not possible" (S1204; YES), since it may be assumed that, for one reason or another, the GPS receiver 30 is in an anomalous condition, the system controller 26 reactivates the GPS receiver 30 (S1205) On the other hand, when the number of captured satellites is three or less (S1204; NO), satellite positional information is restored to initial values (S1206), and non-positioning information is sent back (S1207). Therefore, since the system controller 26 monitors the positioning completion status and the number of satellites captured from among the GGA data outputted from the GPS receiver 30, in a case where positioning has not been completed even though the fixed period has elapsed, since it is possible to detect that the GPS receiver 30 is in an anomalous condition, by reactivating same upon detection of an anomalous condition, the GPS receiver 30 is restored to a normal condition at an early stage, whereby it is possible to reduce the positioning time.

Figure 29:
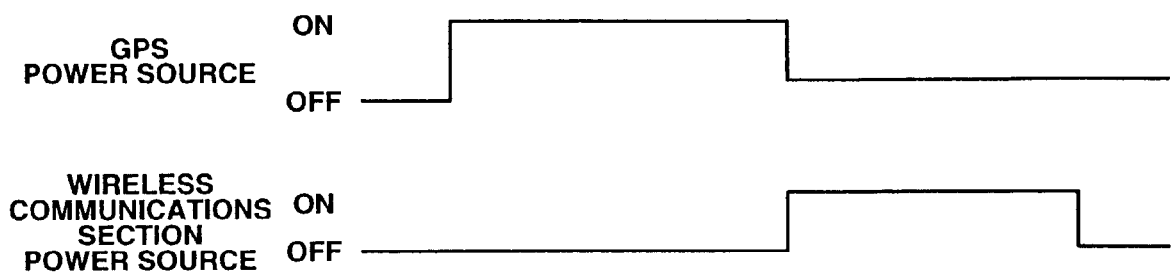
FIG. 29 is an illustrative view of the operation of the power sources of the emergency report cellular phone.

Further, as shown in FIG. 29, a design is desirable in which the power source of the GPS receiver 30 and the power source of the wireless communications section 20 are not ON simultaneously. This is true in order to avoid mutual interference that occurs between the GPS electromagnetic waves and the cellular electromagnetic waves when both these power sources are ON simultaneously. Further, in a case where a design permits both power sources to be ON simultaneously, in comparison with a constitution permitting only one of the sources to be ON at any one time, there is a requirement for a design allowing more current to flow in each circuit, which means that the circuits become complex. However, according to the present embodiment, GPS positioning of good sensitivity can be performed using a simple circuit constitution.

Figure 30:
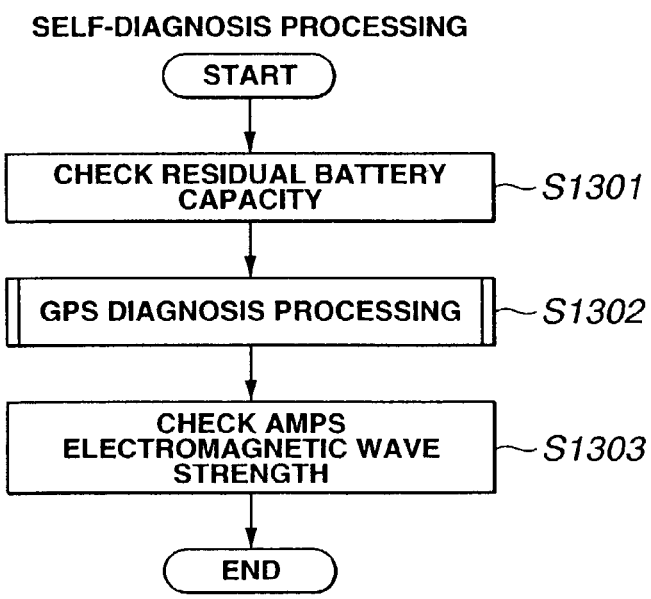
FIG. 30 is a flow chart describing a procedure for self-diagnosis processing.

Next, a description will be provided with regard to the self-diagnosis function of the emergency report cellular phone 10. When a self-diagnosis 17 is depressed for approximately one second, as shown in FIG. 30, the emergency report cellular phone 10 executes a residual battery capacity check (S1301), GPS diagnosis processing (S1302) and an AMPS electromagnetic wave strength check (S1303). In the course of the processing for the residual battery capacity check, the emergency report cellular phone 10 measures the voltage of the battery 27, and checks whether or not a control value is satisfied. Here, when the emergency report cellular phone 10 judges that the battery voltage does not satisfy the control value, the LED 34 switches ON and OFF, and when it is judged that the battery voltage satisfies the control value, the LED 34 remains lit. In the course of the GPS diagnosis processing, the emergency report cellular phone 10 checks whether or not data communications between the GPS receiver 30 and the system controller 26 may be performed normally, and also checks whether or not the GPS receiver 30 is capable of performing GPS positioning within a fixed period. When the results of the checks are such that it is judged that the GPS receiver 30 is not operating normally, the LED 33 switches ON and OFF, and when it is judged that the GPS receiver 30 is operating normally, the LED 33 remains lit. The GPS diagnosis processing will be described in detailed hereinbelow.

In the course of the processing for the AMPS electromagnetic wave strength check, the emergency report cellular phone 10 checks the received electromagnetic wave strength of the AMPS antenna 11, and when it is judged that the electromagnetic wave strength is insufficient, the LED 33 switches ON and OFF, and when it is judged that the electromagnetic wave strength is sufficient, the LED 33 remains lit. Once all the diagnosis processing is complete, if there are no fatal problems, a siren sound is outputted from the siren speaker 16 for five seconds. However, if the GPS receiver 30 has broken down or the residual battery capacity is limited, in order to suggest that the GPS receiver 30 should be repaired or that the battery should be changed, the siren is sounded continuously. Therefore, as a result of the emergency report cellular phone 10 containing a self-diagnosis function, since it is possible to ascertain in advance the residual battery capacity and whether the GPS receiver 30 has broken down, it is possible to maintain the emergency report cellular phone 10 in a normal condition in readiness for emergency reporting at a crucial time.

Figure 31:
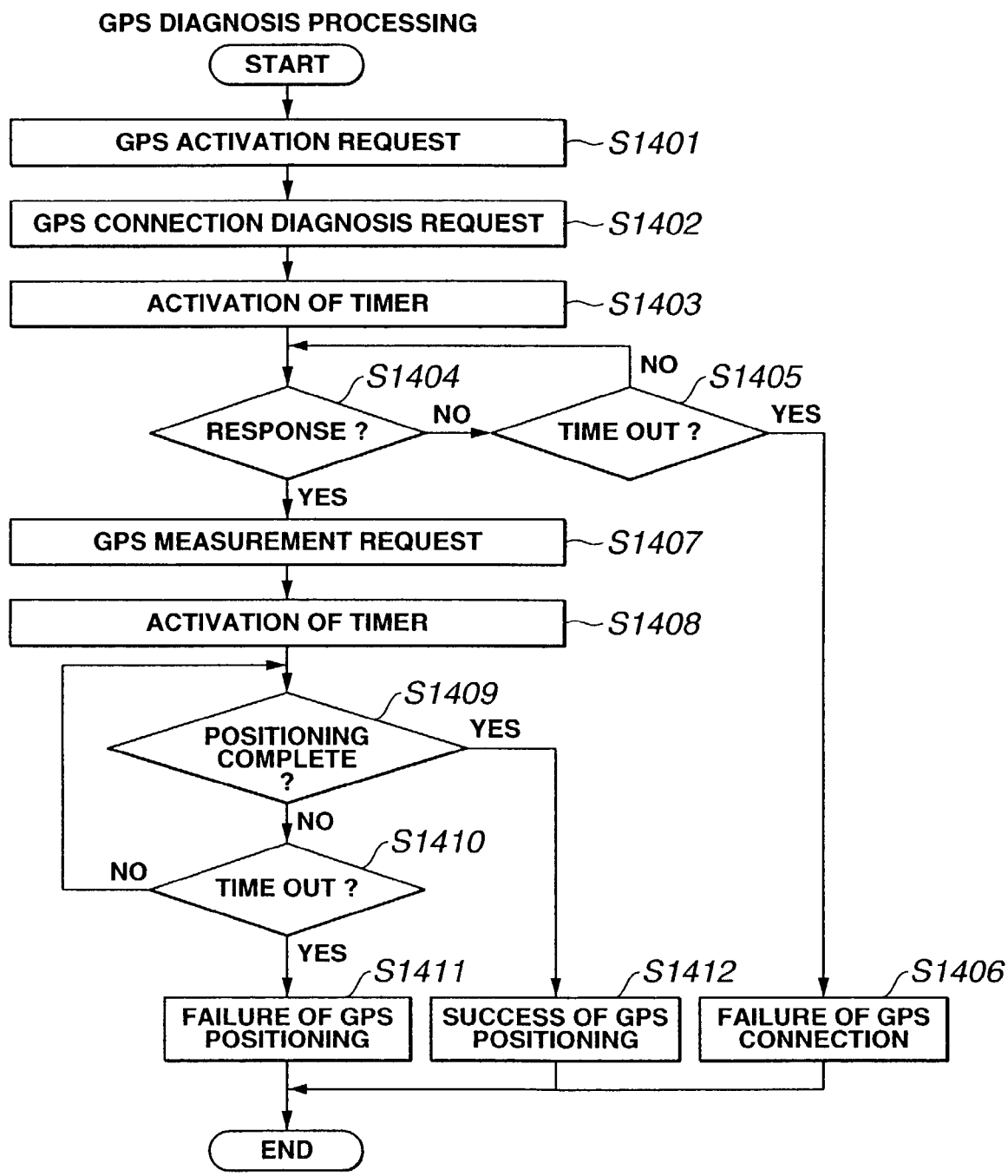
FIG. 31 is a flow chart describing a procedure for GPS diagnosis processing.

Next, a description will be provided with regard to GPS diagnosis processing, referring to FIG. 31. In the same figure, S1401 to S1406 are a processing step (1) that checks whether or not data communications between the GPS receiver 30 and the system controller 26 may be performed normally, and S1407 to S1412 are a processing step (2) that checks whether or not the GPS receiver 30 is capable of performing GPS positioning within a fixed period. In order to perform processing step (1), the system controller 26 makes a GPS activation request to the GPS receiver 30 (S1401), and turns ON the power source of the GPS receiver 30. Next, the system controller 26 transmits a given command to the GPS receiver 30 (S1402), and activates the timer (S1403). If there is a response within a fixed period (S1404; YES), processing step (2) proceeds, but, when there is no response within a fixed period (S1405; YES), it is judged that data communications between the GPS receiver 30 and the system controller 26 cannot be performed normally (S1406).

In the course of the processing step (2), the system controller 26 makes a GPS positioning request to the GPS receiver 30 (S1407) and activates the timer (S1408). If positioning is completed within a fixed period (S1409; YES), it is judged that GPS positioning has been successful (S1412), and when positioning is not completed even though the fixed period has elapsed (S1410; YES), it is judged that GPS positioning has failed (S1411). Since GPS positioning is executed only when it has been confirmed that data communications between the GPS receiver 30 and the system controller 26 can be performed normally, the shortest time taken to complete confirmation of the normal condition of the GPS receiver 30 is on the order of ten seconds.

Figure 32:
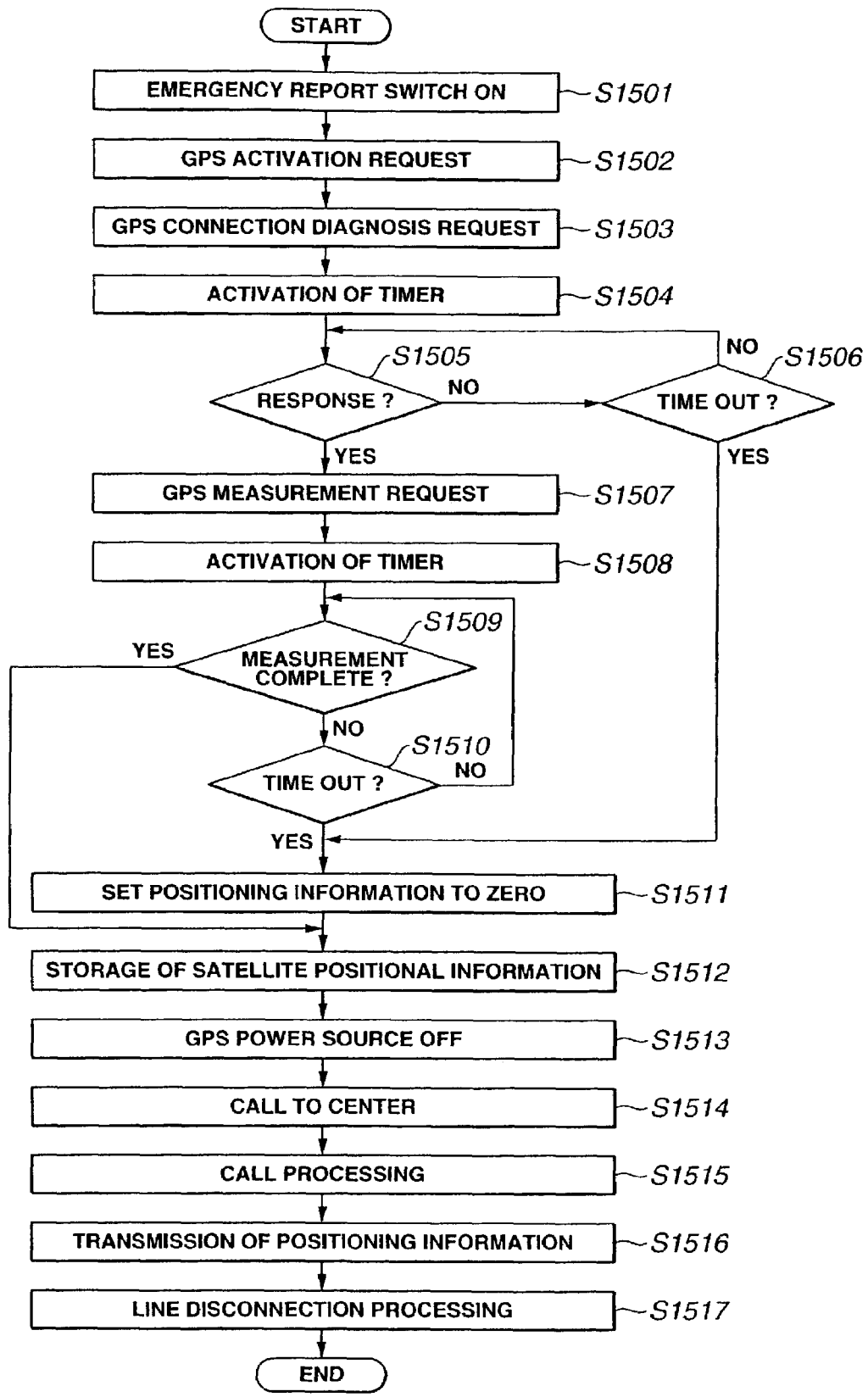
FIG. 32 is a flow chart describing a procedure by which an emergency report cellular phone transmits positioning information to an emergency report center.

FIG. 32 is a flow chart describing a procedure according to which the above GPS diagnosis processing is performed before GPS positioning, and positioning information is transmitted to an emergency report center. In the same figure, if the emergency report switch 14 of the emergency report cellular phone 10 is depressed (S1501), the system controller 26 makes a GPS activation request to the GPS receiver 30 (S1502), and turns ON the power source of the GPS receiver 30. Next, the system controller 26 transmits a given command to the GPS receiver 30 (S1503), and activates the timer (S1504). If there is no response within a fixed period (S1506; YES), it is judged that data communications between the GPS receiver 30 and the system controller 26 cannot be performed normally, and positioning information is set as "0" (S1511), and if there is a response within a fixed period (S1505; YES), a GPS positioning request is made (S1507), and the timer is activated (S1508).

In a case where positioning is not completed even though a fixed period has elapsed (S1510; YES), positioning information is set as "0" (S1511), and in a case where positioning is completed within a fixed period (S1509; YES), satellite positional information is stored in the memory 37 (S1512). Next, the system controller 26 turns OFF the power source of the GPS receiver 30 (S1513), and a call is made to the emergency report center (S1514). When a response message is received by means of a DTMF signal from the emergency report center such that a call link is formed between the emergency report cellular phone 10 and the emergency report center, call processing is performed (S1515) Following completion of the telephone call, the emergency report center converts positioning information into DTMF signals and then transmits this information to the emergency report center (S1516), whereupon line disconnection processing is performed (S1517).

Therefore, since the constitution is such that, in a case where data communications between the GPS receiver 30 and the system controller 26 cannot be performed normally, or in a case where GPS positioning cannot be completed within a fixed period, positioning information is set to "0", and a call is made to the emergency report center invariably within a fixed period, even when an abnormality arises with regard to the GPS receiver 30, it is possible to reduce the time that elapses before a call is made to the emergency report center.

According to the present embodiment, in a case where GPS positioning cannot be completed within a fixed period, since the satellite positional information stored in the storage means is restored to initial values, a reduction of the next GPS positioning time can be expected.

Further, according to the present embodiment, in a case where GPS positioning cannot be completed within a fixed period, by checking the number of satellites captured, the cause of why GPS positioning was not possible can be judged as being attributable to an environment not permitting GPS positioning, such as indoors, or to a great disparity between the previous GPS positioning point and the present positioning point. When the cause of GPS positioning not being possible lies with the latter disparity, by restoring the satellite positional information to initial values, a reduction of the next GPS positioning time can be expected.

Also, according to the present embodiment, in a case where GPS positioning cannot be completed within a fixed period, by checking the number of satellites captured, when the number of satellites captured is four or more, it is assumed that an abnormality has arisen with regard to the GPS positioning means, and, by reactivating same, the normal condition of the GPS positioning means can be rapidly ensured such that reliable emergency reporting can be achieved.

Moreover, according to the present embodiment, since positional information for the country where the emergency report cellular phone was sold, and information for the current position are set as initial values, a reduction in the GPS positioning time is conceivable.

In addition, according to the present embodiment, since the wireless communication means connects a communications line with the emergency report center after the above-mentioned fixed time has elapsed to transmit longitudinal and latitudinal information obtained by means of GPS positioning, a connection with respect to an emergency report center can be performed within a fixed time and it is thus possible to improve reliability of emergency reporting.

Also, according to the present embodiment, since the power source of the GPS positioning means and the power source of the wireless communications means are constituted so as to not be ON simultaneously, it is possible to suppress mutual interference between the GPS electromagnetic waves and the wireless electromagnetic waves, whereby a reduction in the GPS positioning time is conceivable.

Furthermore, according to the present embodiment, since the GPS positioning means performs GPS positioning on the basis of a GPS positioning instruction optionally given by a user at a time other than when an emergency report is being made, and stores satellite positional information for the time when the GPS positioning was performed in the storage means, a reduction in the next GPS positioning time can be expected.

Moreover, according to the present embodiment, since it is possible to check in advance for an anomalous condition of the GPS receiver, as well as the residual battery capacity and the received electromagnetic wave strength, when a breakdown or the like occurs, by conducting repairs and so forth, it is possible to improve the reliability of emergency reporting.

What is claimed is:

1. An emergency report cellular phone, comprising: a microphone and a speaker, which are employed for interaction with an emergency report center and which implement a speaker phone function; a siren for notification of a state of emergency; a drive section, which, so that a reporting party interacts with the emergency report center by means of said speaker phone function, intermittently drives the siren; and a wireless communications section, which, when the siren function of said siren is ON, and at a time when said siren is not being driven, performs data communications with the emergency report center via an analog wireless line.

2. An emergency report cellular phone, comprising: a system controller containing a siren intermittent drive section for intermittently driving a siren, and a communications enable signal generating section, which, on the basis of an intermittent siren drive signal, outputs a communications enable signal; a memory, which stores information for connections; a cellular transceiver section, which connects to a cellular system to transmit and receive data and/or voice signals; a voice processing section, which contains a DTMF encoder for data communications and which is for voice communications with the emergency report center via said cellular system; a DTMF decoder, which decodes DTMF signals transmitted from the emergency report center and then outputs the decoded result to said system controller; a speaker and a microphone, which are connected with said voice processing section; and a siren, which is driven by the intermittent siren drive signal and which performs notification of a state of emergency to the surrounding area; wherein, even in a state in which the siren function is ON on the basis of said communications enable signal, said emergency report cellular phone performs data communications at a time when said siren is not being driven.

3. The emergency report cellular phone according to claim 2, wherein said communications enable signal generating section outputs said communications enable signal by inverting the logic of the siren drive signal.

4. The emergency report cellular phone according to claim 2, wherein an edge of said communications enable signal indicating a communications enabled state is delayed from an edge of the siren drive signal indicating drive OFF by a period from stoppage of said siren until the power supply voltage of the device returns to normal.

5. The emergency report cellular phone according to claim 2, wherein, when said communications enable signal generating section generates said communications enable signal, an edge of said communications enable signal indicating a communications disabled state is substantially synchronous with an edge of the siren drive signal indicating drive ON.

6. An emergency report cellular phone, comprising: a system controller, which contains a connection system switching section for connecting to a plurality of cellular systems; a memory, which stores information for connections; a cellular transceiver section, which connects to a cellular system to transmit and receive data and/or voice signals; a voice processing section, which contains a DTMF encoder for data communications by means of DTMF signals, and which is for voice communications with an emergency report center via said cellular systems; a DTMF decoder, which decodes DTMF signals transmitted from said emergency report center and then outputs the decoded result to said system controller; a microphone and a speaker, which are connected with said voice processing section; a siren, which performs notification of a state of emergency; and a timer for judging processing time out, wherein said memory stores system A connection information, system B connection information, and a maximum connection frequency, and said connection system switching section uses a system A and a system B on the basis of the content of said memory and the output of said timer and following a predetermined procedure such that while the connection system switching section performs connection processing with respect to a preset first telephone number, when connection with respect to said first telephone number is not possible, same performs connection processing with respect to a preset second telephone number, wherein said connection system switching section sets systems for connection as preset systems; on the basis of the system A connection information or system B connection information stored in said memory, connects to said first telephone number or said second telephone number; activates said timer; according to whether a user identification request signal is received, judges whether or not a connection has been established; on the basis of the output of said timer, judges whether or not time out is effected; and, when the time out judgement frequency is no more than the maximum connection frequency stored in said memory, switches the system for connection, and once more repeats the connection with respect to said first telephone number or said second telephone number.

7. An emergency report cellular phone, comprising: a system controller, which contains a connection system switching section for connecting to a plurality of cellular systems; a memory, which stores information for connections; a cellular transceiver section, which connects to a cellular system to transmit and receive data and/or voice signals; a voice processing section, which contains a DTMF encoder for data communications by means of DTMF signals, and which is for voice communications with an emergency report center via said cellular systems; a DTMF decoder, which decodes DTMF signals transmitted from said emergency report center and then outputs the decoded result to said system controller; a microphone and a speaker, which are connected with said voice processing section; a siren, which performs notification of a state of emergency; and a timer for judging processing time out, wherein said memory stores system A connection information, system B connection information, and a maximum connection freciuency, and said connection system switching section uses a system A and a system B on the basis of the content of said memory and the output of said timer and following a predetermined procedure such that while the connection system switching section performs connection processing with respect to a preset first telephone number, when connection with respect to said first telephone number is not possible, same performs connection processing with respect to a preset second telephone number, wherein said connection system switching section sets systems for connection as preset systems; on the basis of the system A connection information or said system B connection information stored in said memory, connects to said first telephone number or said second telephone number; sets a start channel of a control channel search; judges whether or not connection is possible in accordance with the existence or non-existence of a control channel; judges whether or not a final channel of a control channel search has been reached; and, when the frequency of judging whether or not the final channel has been reached is no more than the maximum connection frequency stored in said memory, switches the system for connection, and once more repeats the connection with respect to said first telephone number or said second telephone number.

8. An emergency report cellular phone, comprising: a system controller, which contains a connection system switching section for connecting to a plurality of cellular systems; a memory, which stores information for connections; a cellular transceiver section, which connects to a cellular system to transmit and receive data and/or voice signals; a voice processing section, which contains a DTMF encoder for data communications by means of DTMF signals, and which is for voice communications with an emergency report center via said cellular systems; a DTMF decoder, which decodes DTMF signals transmitted from said emergency report center and then outputs the decoded result to said system controller; a microphone and a speaker, which are connected with said voice processing section; a siren, which performs notification of a state of emergency; and a timer for judging processing time out, wherein said memory stores system A connection information, system B connection information, and a maximum connection frequency, and said connection system switching section uses a system A and a system B on the basis of the content of said memory and the output of said timer and following a predetermined procedure such that while the connection system switching section performs connection processing with respect to a preset first telephone number, when connection with respect to said first telephone number is not possible, same performs connection processing with respect to a preset second telephone number, wherein said connection system switching section sets systems for connection as preset systems; on the basis of the system A connection information or said system B connection information stored in said memory, connects to said first telephone number or said second telephone number; activates said timer; according to whether or not origination is successful, judges whether or not a connection has been established; on the basis of the output of said timer, judges whether or not time out is effected; and, when said time out judgement frequency is no more than the maximum connection frequency stored in said memory, switches the system for connection, and once more repeats the connection with respect to said first telephone number or said second telephone number.

* * * * *